United States Patent
Bolcavage et al.

(10) Patent No.: US 8,852,720 B2
(45) Date of Patent: Oct. 7, 2014

(54) SUBSTRATE FEATURES FOR MITIGATING STRESS

(75) Inventors: Ann Bolcavage, Indianapolis, IN (US); Raymond J. Sinatra, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 302 days.

(21) Appl. No.: 12/837,051

(22) Filed: Jul. 15, 2010

(65) Prior Publication Data

US 2011/0097538 A1   Apr. 28, 2011

Related U.S. Application Data

(60) Provisional application No. 61/226,325, filed on Jul. 17, 2009.

(51) Int. Cl.
| | |
|---|---|
| *B32B 3/24* | (2006.01) |
| *B32B 3/30* | (2006.01) |
| *B32B 3/26* | (2006.01) |
| *B05D 1/36* | (2006.01) |
| *B05D 3/00* | (2006.01) |
| *C23C 4/02* | (2006.01) |
| *F01D 5/28* | (2006.01) |

(52) U.S. Cl.
CPC ..................... *F01D 5/288* (2013.01)
USPC ........... 428/167; 428/131; 428/137; 428/156; 428/162; 428/163; 428/172; 428/212; 428/218; 428/332; 416/97 R; 427/275; 427/299; 427/402; 427/446

(58) Field of Classification Search
None
See application file for complete search history.

(56) References Cited

U.S. PATENT DOCUMENTS

| | | | |
|---|---|---|---|
| 2,564,497 A | 8/1951 | Navias | |
| 4,289,447 A * | 9/1981 | Sterman et al. | ............... 415/200 |
| 4,589,823 A | 5/1986 | Koffel | |

(Continued)

FOREIGN PATENT DOCUMENTS

| | | | | |
|---|---|---|---|---|
| CA | 2525283 A1 | 5/2006 | | |
| DE | 19619438 A1 * | 11/1997 | ................ | F01D 5/20 |

(Continued)

OTHER PUBLICATIONS

Inghram et al., Flame Spray Handbook, vol. 1, Metco, Inc. (1964) (no month).*

(Continued)

*Primary Examiner* — Aaron Austin
*Assistant Examiner* — Jeff Vonch
(74) *Attorney, Agent, or Firm* — Shumaker & Sieffert, P.A.

(57) ABSTRACT

An article may include an array of features formed in a substrate and may be coated by a thermal barrier coating (TBC). The array of features may mitigate thermal stress experienced by the coated article. In particular, the array of features may reduce or limit crack propagation at or above the interface of a thermally insulative layer and a bond coat in the TBC. In some embodiments, the array may be formed proximate to and substantially aligned with cooling holes formed in the substrate. In other embodiments, an article may include a first array of features formed in a first location of a substrate and a second array of features formed in a second location of a substrate. The first and second locations may be determined or selected based on a prediction of thermal stresses that the substrate will experience at the first and second locations during use.

35 Claims, 19 Drawing Sheets

(56) References Cited

U.S. PATENT DOCUMENTS

| | | | |
|---|---|---|---|
| 4,682,933 A | | 7/1987 | Wagner |
| 5,030,060 A | * | 7/1991 | Liang ............................ 415/115 |
| 5,223,332 A | | 6/1993 | Quets |
| 5,419,971 A | | 5/1995 | Skelly et al. |
| 5,435,889 A | * | 7/1995 | Dietrich .......................... 216/63 |
| 5,460,002 A | | 10/1995 | Correa |
| 5,476,363 A | | 12/1995 | Freling et al. |
| 5,520,516 A | | 5/1996 | Taylor et al. |
| 5,558,922 A | | 9/1996 | Gupta et al. |
| 5,621,968 A | * | 4/1997 | Kikkawa et al. ............. 29/889.7 |
| 5,830,586 A | | 11/1998 | Gray et al. |
| 5,993,980 A | * | 11/1999 | Schmitz et al. ................ 428/633 |
| 5,997,251 A | | 12/1999 | Lee |
| 6,027,306 A | | 2/2000 | Bunker |
| 6,074,706 A | * | 6/2000 | Beverley et al. .............. 427/454 |
| 6,190,124 B1 | | 2/2001 | Freling et al. |
| 6,251,526 B1 | | 6/2001 | Staub |
| 6,316,078 B1 | * | 11/2001 | Smialek ......................... 428/141 |
| 6,461,107 B1 | | 10/2002 | Lee et al. |
| 6,461,108 B1 | | 10/2002 | Lee et al. |
| 6,471,881 B1 | | 10/2002 | Chai et al. |
| 6,503,574 B1 | * | 1/2003 | Skelly et al. ................... 427/446 |
| 6,511,762 B1 | | 1/2003 | Lee et al. |
| 6,526,756 B2 | | 3/2003 | Johnson et al. |
| 6,551,061 B2 | | 4/2003 | Darolia et al. |
| 6,716,539 B2 | | 4/2004 | Subramanian |
| 6,720,087 B2 | * | 4/2004 | Fried et al. ..................... 428/614 |
| 7,229,253 B2 | | 6/2007 | Broderick et al. |
| 7,291,403 B2 | | 11/2007 | Nagaraj et al. |
| 7,544,043 B2 | | 6/2009 | Eastman et al. |
| 7,704,596 B2 | * | 4/2010 | Merrill et al. .............. 428/293.4 |
| 2001/0004436 A1 | | 6/2001 | Chasripoor et al. |
| 2003/0059309 A1 | | 3/2003 | Szucs et al. |
| 2005/0064146 A1 | * | 3/2005 | Hollis et al. ................... 428/167 |
| 2005/0238488 A1 | | 10/2005 | Eastman et al. |
| 2006/0151856 A1 | | 7/2006 | Torigoe et al. |
| 2007/0253817 A1 | * | 11/2007 | Bezencon et al. ........... 416/97 R |
| 2007/0274837 A1 | | 11/2007 | Taylor et al. |
| 2008/0085191 A1 | * | 4/2008 | Liang ........................ 416/241 R |
| 2008/0145629 A1 | * | 6/2008 | Anoshkina et al. ............ 428/213 |
| 2009/0017260 A1 | | 1/2009 | Kulkarni et al. |
| 2010/0047512 A1 | * | 2/2010 | Morrison et al. ................ 428/86 |
| 2010/0166566 A1 | | 7/2010 | Hatman |
| 2010/0272953 A1 | * | 10/2010 | Yankowich et al. .......... 428/138 |
| 2011/0014060 A1 | | 1/2011 | Bolcavage et al. |

FOREIGN PATENT DOCUMENTS

| | | | | |
|---|---|---|---|---|
| DE | 102005050873 A1 | * | 4/2007 | ................ C23C 4/02 |
| EP | 0712940 A1 | | 5/1996 | |
| EP | 0935009 A1 | | 8/1999 | |
| EP | 1228898 A1 | | 8/2002 | |
| GB | 2155558 A | | 9/1985 | |
| WO | WO 9633837 A1 | * | 10/1996 | ............. B23K 15/08 |
| WO | 0159262 A1 | | 8/2001 | |
| WO | 2009091721 A2 | | 7/2009 | |
| WO | 2009126194 A1 | | 10/2009 | |

OTHER PUBLICATIONS

Nissley, Thermal Barrier Coating Life Modeling in Aircraft Gas Turbine Engines, Journal of Thermal Spray Technology, vol. 6, Ed. 1, Mar. 1997.*

U.S. Appl. No. 12/837,024, filed Jul. 15, 2010, entitled, "Substrate Features for Mitigating Stress".

U.S. Appl. No. 61/293,930, filed Jan. 11, 2010, entitled, "Features for Mitigating Thermal or Mechanical Stress on an Environmental Barrier Coating".

U.S. Appl. No. 61/382,268, filed Sep. 13, 2010, entitled, "Features for Mitigating Thermal or Mechanical Stress on an Environmental Barrier Coating".

Second Written Opinion conducted by the Hungarian Patent office and received from the Intellectual Property Orffice of Singapore for corresponding Singapore application No. 201005239-7, dated Apr. 2, 2012, 8 pp.

Office Action from Canadian application No. 2,710,053, dated Jun. 5, 2012, 3 pp.

Written Opinion from the Intellectual Property Office of Singapore for corresponding Singapore application No. 201005239-7, dated Aug. 23, 2011, 8 pp.

Search Report and Written Opinion from corresponding Singapore application No. SG 201005239-7, mailed Nov. 23, 2010, 13 pp.

Response to Official Action dated Jun. 5, 2012, from corresponding Canadian application No. 2,710,053, filed Dec. 5, 2012, 15 pp.

Office Action from U.S. Appl. No. 12/837,024, dated Jan. 17, 2013, 17 pp.

Response to Office Action dated Jan. 17, 2013, from U.S. Appl. No. 12/837,024, filed Apr. 16, 2013, 12 pp.

Response to Office Action dated Jul. 17, 2013, from U.S. Appl. No. 12/837,024, filed Oct. 17, 2013, 16 pp.

Office Action from corresponding Canadian application No. 2,710,053, dated Apr. 26, 2013, 2 pp.

Office Action from U.S. Appl. No. 12/837,024, dated Jul. 17, 2013, 16 pp.

Response to Official Action dated Apr. 26, 2013, from counterpart Canadian application No. 2,710,053, filed Oct. 22, 2013, 12 pp.

Notice of Appeal for U.S. Appl. No. 12/837,024 filed on Apr. 2, 2014, 1 pp.

Office Action from Canadian counterpart application No. 2,710,053 dated Mar. 11, 2014, 2 pp.

Office Action from U.S. Appl. No. 12/837,024, dated Jan. 29, 2014, 16 pp.

* cited by examiner

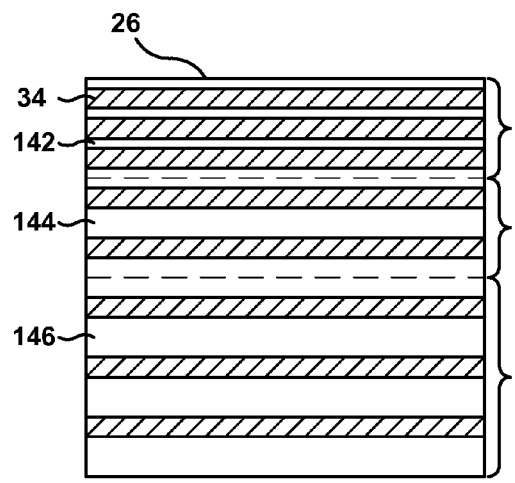
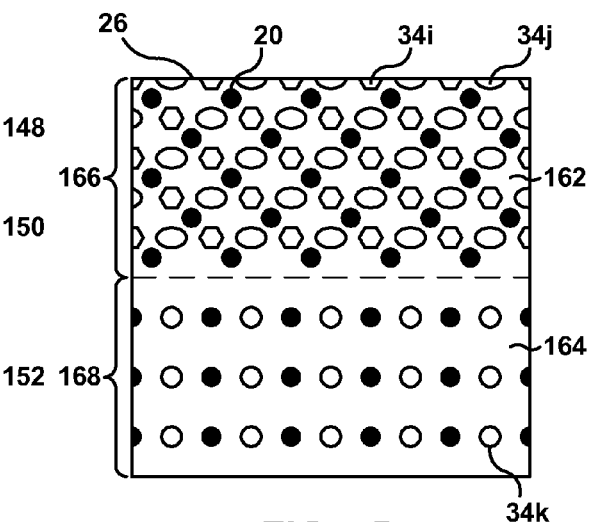
FIG. 7C  FIG. 7D
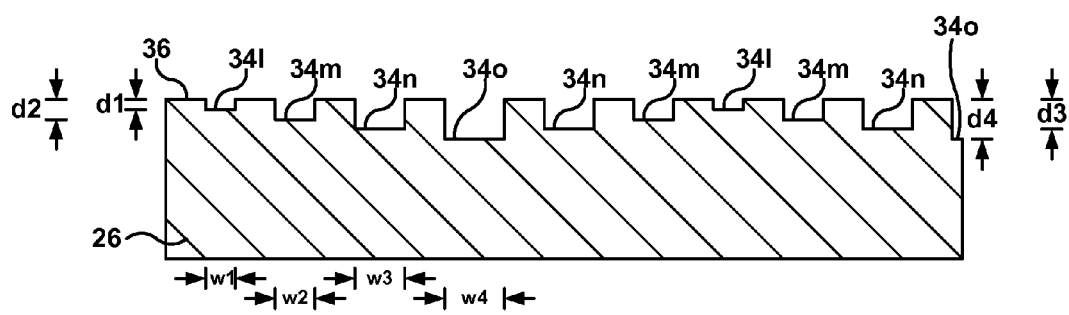
FIG. 8

SUBSTRATE FEATURES FOR MITIGATING STRESS

This application claims the benefit of U.S. Provisional Application No. 61/226,325, entitled, "SUBSTRATE FEATURES FOR MITIGATING THERMAL STRESS ON AN ARTICLE COATED WITH A THERMAL BARRIER COATING," filed on Jul. 17, 2009, the entire content of which is incorporated herein by reference.

TECHNICAL FIELD

The disclosure is directed to techniques for mitigating stress experienced by an article that includes a coating layer.

BACKGROUND

The components of high-temperature mechanical systems, such as, for example, gas-turbine engines, must operate in severe environments. For example, the combustor liners exposed to hot gases in commercial aeronautical engines typically experience coating surface temperatures of up to about 1150° C. to about 1400° C.

Typical components of high-temperature mechanical systems include a Ni or Co-based superalloy substrate. The substrate can be coated with a thermal barrier coating (TBC) to reduce surface temperatures. The thermal barrier coating may include a thermally insulative ceramic topcoat, and may be bonded to the substrate by an underlying metallic bond coat.

The component may be exposed to widely different temperatures during operation and when operation is ceased. These widely different temperatures may cause significant thermal stress to the TBC, which eventually may lead to spallation of the TBC from the substrate. The stress may be due to, for example, the substrate/bond coat and TBC having different coefficients of thermal expansion, or the substrate/bond coat and TBC experiencing different temperatures due to thermal gradients.

SUMMARY

In general, the disclosure is directed to techniques for mitigating stress experienced by an article that includes a coating layer. In some examples, the article is a blade airfoil that includes a tip that defines an edge. The article may be coated with a one or more coating layers to protect the airfoil from environmental conditions experienced by the airfoil during operation. Different forces acting on the airfoil during operation may have a tendency to promote detachment between the underlying airfoil substrate and the one or more coating layers. In some examples, forces may concentrate at an edge of the airfoil, causing crack growth to begin at the edge of the airfoil and propagate away from the edge. Over time, the different forces acting on the airfoil may lead to crack formation and growth in the one or more coating layers, thereby promoting delamination between the airfoil and the one or more coating layers. The present disclosure provides techniques for mitigating crack propagation and detachment of a coating layer from an underlying substrate.

In some examples, the article may be coated with a thermal barrier coating (TBC). For example, an article may be coated with a TBC that includes a thermally insulative layer. The thermally insulative layer is bonded to the substrate by a metallic bond coat. In some embodiments, the substrate/bond coat and the thermally insulative layer may have different coefficients of thermal expansion and thus undergo different amounts of thermal expansion and/or contraction when a temperature of the article changes. In addition, because the TBC insulates the substrate, the substrate and TBC may experience different temperatures, which may further affect the relative amounts of expansion and/or contraction experienced by the substrate and TBC. This may lead to mechanical stress at or above the bond coat/TBC interface, which over time may lead to crack formation and growth in the TBC. Eventually, when the crack grows to a sufficient size, the TBC may detach from the substrate. This may leave an area of the substrate or bond coat exposed to elevated temperatures that may be harmful to the substrate or bond coat.

In one aspect, the disclosure is directed to an article including a substrate, at least one cooling hole formed in the substrate, an array of features formed on a surface of the substrate, and a thermal barrier coating formed on the substrate and the first array of features. The array of features may be proximate to and substantially aligned with the at least one cooling hole.

In another aspect, the disclosure is directed to an article including a substrate and a first array of features on a surface of the substrate at a first location. The first array may comprise a first pattern. The article also includes a second array of features on the surface of the substrate at a second location. The second array may comprise a second pattern different than the first pattern. The first location may be predicted to experience a first level of thermal stress and the second location may be predicted to experience a second level of thermal stress different than the first level of thermal stress. The article further includes a thermal barrier coating formed on the substrate, the first array of features, and the second array of features.

In a further aspect, the disclosure is directed to a method including forming an array of features on a surface of a substrate and forming a thermal barrier coating over the substrate and the array of features. The array of features may be proximate to and substantially aligned with at least one cooling hole formed in the substrate.

In an additional aspect, the disclosure is directed to a method including forming a first array of features on a surface of a substrate at a first location. The first location may be selected based on a first predicted level of thermal stress, and the first array of features comprises a first pattern. The method also includes forming a second array of features on the surface of the substrate at a second location. The second location may be selected based on a second predicted level of thermal stress, and the second array of features comprises a second pattern different than the first pattern. The method further includes forming a thermal barrier coating over the substrate, the first array of features, and the second array of features.

In another aspect, the disclosure is directed to an airfoil that includes a tip that defines an edge and an array of features formed on a surface of the tip. The array of features is proximate to the edge, and the array of features does not intersect the edge. A coating layer is formed on the surface of the substrate and the array of features.

In another aspect, the disclosure is directed to an airfoil that includes a tip that defines an edge, a first array of features formed on a surface of the tip at a first location, and a second array of features formed on the surface of the tip at a second location. The first array includes a first pattern and the second array includes a second pattern different than the first pattern. The first location is predicted to experience a first level of stress and the second location is predicted to experience a second level of stress different than the first level of stress. The first array of features and the second array of features do not intersect the edge. The airfoil includes a coating layer on the tip, the first array of features, and the second array of features.

In another aspect, the disclosure is directed to a method that includes forming an array of features on a tip surface of an airfoil that defines an edge and forming a coating layer on the tip surface and the array of features. According to the method, the array of features is proximate to the edge, and the array of features does not intersect the edge.

The details of one or more examples are set forth in the accompanying drawings and the description below. Other features, objects, and advantages will be apparent from the description and drawings, and from the claims.

BRIEF DESCRIPTION OF DRAWINGS

FIGS. 7A-7D are conceptual diagrams of exemplary substrates in which first and second arrays of features are formed in first and second locations of the substrate, respectively.

FIG. 8 is a cross-sectional diagram of an exemplary substrate that includes features formed with different sizes and depths.

DETAILED DESCRIPTION

Figure 1A:
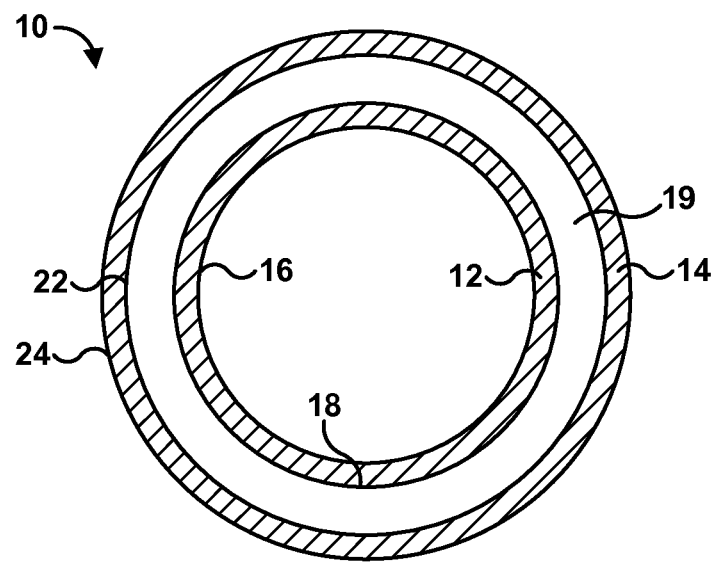
FIGS. 1A and 1B are cross-sectional diagrams of an exemplary gas turbine engine combustor liner.

In general, the present disclosure is directed to techniques for mitigating thermal stress in an article coated with a thermal barrier coating (TBC) and increasing the life span of the TBC. As described above, an article, such as a gas turbine engine combustor liner, may experience widely varying temperatures during use. These changes in temperature may lead to thermal stress at an interface between two layers having different coefficients of thermal expansion. For example, an article may be coated with a TBC that includes a bond coat formed on a substrate of the article and a thermally insulative layer formed on the bond coat. In some embodiments, the substrate/bond coat and the thermally insulative layer may have different coefficients of thermal expansion and thus undergo different amounts of thermal expansion and/or contraction when a temperature of the article changes. This may lead to mechanical stress at or above the interface of the bond coat and thermally insulative layer, which over time may lead to crack formation and growth in the thermally insulative layer. Eventually, when the crack grows to a sufficient size, the thermally insulative layer may detach from the substrate. This may leave an area of the substrate or bond exposed to elevated temperatures that may be harmful to the substrate or bond coat.

Disclosed herein are techniques for minimizing the effect of crack growth in the thermally insulative layer. The techniques include forming features in a surface of the substrate. The features disrupt the relative planarity of the surface and impede crack growth or propagation. In particular, when a crack forms in the thermally insulative layer and begins to propagate in a plane substantially parallel to the surface of the substrate, the features serve as an impediment to further crack growth by presenting an interface between two materials, e.g., the thermally insulative layer and the bond coat, across which the crack would be required to grow. In effect, the features segregate the substrate and TBC into a plurality of smaller domains. Crack growth may occur within individual domains, but the features hinder crack growth between adjacent domains.

In some embodiments, the features may be formed in the substrate proximate to and substantially aligned with cooling holes formed in the substrate. Such an arrangement may improve thermal stress resistance of the article compared to a substrate that does not include such features. For example, if the thermally insulative layer delaminates from a substrate domain, the proximity of the substrate domains to cooling holes may allow air flowing from the cooling holes to provide some thermal protection to the exposed substrate. The cooling holes may also improve thermal performance of the article when the thermally insulative layer is intact and attached to the substrate.

In some embodiments, the features may be formed in a first array in a first location on the substrate and in a second array in a second location on the substrate. The pattern of the first array and the pattern of the second array, and the first and second locations, may be selected based on a prediction of the thermal stress that the substrate will experience at the first location and the second location, respectively. For example, the substrate may experience higher temperatures or more severe temperature changes at the first location and lower temperatures or less severe temperature changes at the second location. Based on this, the pattern of the first array of features may be selected to be different than the pattern of the second array of features. For example, the first array of features may include features that are spaced more closely together, have a different shape, or include another characteristic that provides superior thermal stress mitigation than the second array of features. In some embodiments, the first and second arrays of features each may be proximate to and substantially aligned with cooling holes in the substrate.

Figure 1B:
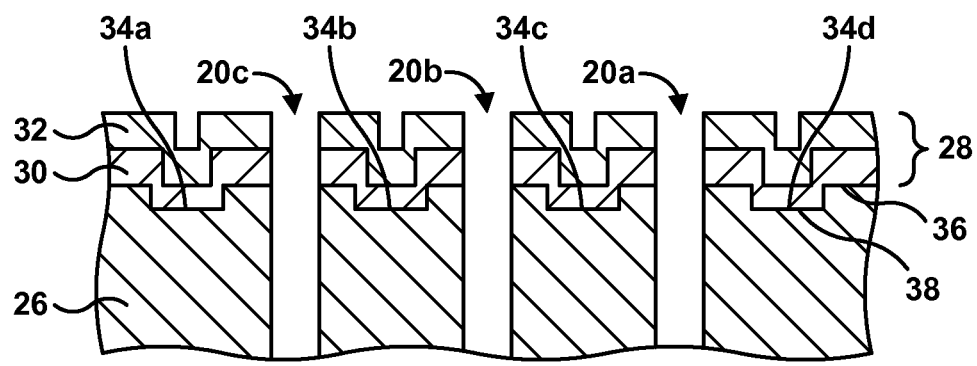

FIGS. 1A and 1B are cross-sectional diagrams of a simplified example of a gas turbine engine combustor section 10 including an inner combustor liner 12 and an outer combustor liner 14. Combustor section 10 may be a tiled combustor section, in which a plurality of separate metal sheets are joined to form each of inner combustor liner 12 and outer combustor liner 14, or each of inner combustor liner 12 and outer combustor liner 14 may be formed of substantially a single sheet of metal. Inner combustor liner 12 defines an inner surface 16 and an outer surface 18, and outer combustor liner 14 defines an inner surface 22 and an outer surface 24. Inner combustor liner 12 and outer combustor liner 14 define a combustion chamber 19 in the annulus between outer surface 18 and inner surface 22. Substrate features may be formed according to the techniques of the present disclosure on either or both of outer surface 18 of inner combustor liner 12 or inner surface 22 of outer combustor liner 14. Although not shown in FIG. 1A, either or both of outer surface 18 of inner combustor liner 12 or inner surface 22 of outer combustor liner 14 may define a plurality of cooling holes 20.

As described above, gas turbine engine combustor section 10 may be a component of a high temperature mechanical system, such as a gas turbine engine. When used in a high temperature mechanical system, inner combustor liner 12 and/or outer combustor liner 14 may experience high temperatures and/or large temperature changes. Thus, outer surface 18 of inner combustor liner 12 and/or inner surface 22 of outer combustor liner 14 may include a thermally protective coating formed on a substrate 26 (FIG. 1B). For example, substrate 26 may be coated with a thermal barrier coating (TBC) 28, which includes a bond coat 30 and a thermally insulative layer 32 that provides thermal insulation for outer surface 18 of inner combustor liner 12, inner surface 22 of outer combustor liner 14, or both.

Substrate 26 may comprise, for example, a superalloy based on Ni, Co, Ni/Fe, or the like. A substrate 26 including a superalloy may include other additive elements to alter its mechanical properties, such as toughness, hardness, temperature stability, corrosion resistance, oxidation resistance, and the like, as is well known in the art. In some embodiments, substrate 26 may include at least one of Cr, Mo, Ta, B, C, Co, Al, Hf, Re, or the like. Any useful superalloy may be utilized for substrate 26, including, for example, those available from Haynes International, Kokomo, Ind., under the trade designations Haynes 230® and Hastelloy X®, and the like.

Bond coat 30 may be formed on substrate 26, and may increase adhesion between substrate 26 and thermally insulative layer 32. Bond coat 30 may include an alloy, such as a MCrAlX alloy (where M is Ni, Co, or NiCo, and X is Y, Hf, Ce, La, Si, or combinations thereof). In some embodiments bond coat 30 may include a MCrAlX alloy modified by Pt, another precious metal group element, or a refractory metal.

Bond coat 30 may be formed on substrate by, for example, a thermal spraying technique, such as air plasma spraying (APS), low pressure plasma spraying (LPPS), high velocity oxy-fuel spraying (HVOF), electroplating, or the like.

Although not shown in FIG. 1B, radially inward combustion liner 12 or radially outward combustor liner 14 may sometimes include a thermally grown oxide (TGO) formed on bond coat 30. In some embodiments, the TGO may be formed by oxidizing bond coat 30. For example, bond coat 30 may be heated in an oxidizing atmosphere during service to grow the TGO on bond coat 30. In many embodiments, the TGO comprises alumina ($Al_2O_3$), along with other elements diffused from bond coat 30 or substrate 26.

Thermally insulative layer 32 may provide thermal protection (insulation) to substrate 26. Thermally insulative layer 32 may comprise at least one of a variety of materials, including, for example, yttria-stabilized zirconia, yttria-stabilized hafnia, a rare earth oxide, a rare earth oxide-stabilized zirconia, a rare earth oxide-stabilized hafnia, a silicate, a zirconate, an aluminate, or combinations thereof.

Yttria-stabilized zirconia includes zirconia ($ZrO_2$) mixed with a minority amount of yttrium oxide ($Y_2O_3$). For example, one yttria-stabilized zirconia composition includes zirconia stabilized by about 7 wt. % to about 8 wt. % yttrium oxide. In some embodiments, yttria-stabilized zirconia may further include another rare earth oxide.

Rare earth oxides used in thermally insulative layer 32 include, for example, oxides of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), scandium (Sc), and combinations thereof. The same rare earth elements may also be useful when present as rare earth silicates, rare earth aluminates, or rare earth zirconates.

In the embodiment illustrated in FIG. 1B, substrate 26 includes four features 34a, 34b, 34c, and 34d (collectively "features 34") formed in a surface 36 of substrate 26. Features 34 may comprise depressions formed in surface 36, and may be formed by, for example, chemical etching, photolithography, laser machining, electrochemical machining, electro-discharge machining, micromachining, vibropeening, or the like.

Each of the features 34 disrupts the relative planarity of surface 36, e.g., each of features 34 may form a discontinuity in surface 36. Features 34 may impede crack growth in thermally insulative layer 32 in a plane parallel to surface 36. While not wishing to be bound by any particular theory, features 34 may result in an interface between bond coat 30 and thermally insulative layer 32 across which a crack would need to propagate to grow from a portion of thermally insulative layer 32 located in a feature 34 to a portion of thermally insulative layer 32 located on a plateau of surface 36. The transition between dissimilar materials, e.g., bond coat 30 and thermally insulative layer 32, may impede crack growth across the interface of the two materials, and may contain crack growth to a single domain, e.g., a portion of thermally insulative layer 32 located in a feature 34 or a portion of thermally insulative layer 32 located on a plateau of surface 36. Accordingly, even if a crack grows to the extent that a portion of TBC 28 delaminates from substrate 26, the portion of TBC 28 that delaminates may be limited to a portion above a feature 34 or a portion above a plateau of surface 36.

Figure 2A:
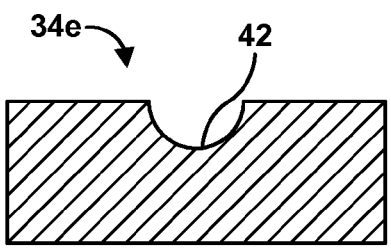
FIGS. 2A-2D are cross-sectional diagrams illustrating exemplary cross-sectional shapes of features formed in a substrate.
Figure 2B:
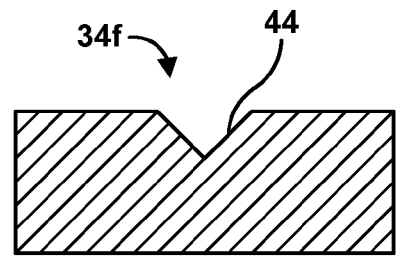
Figure 2C:
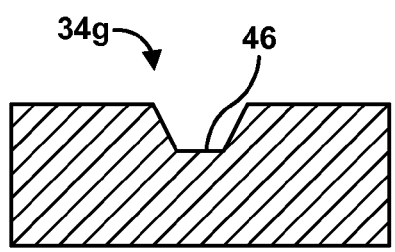
Figure 2D:
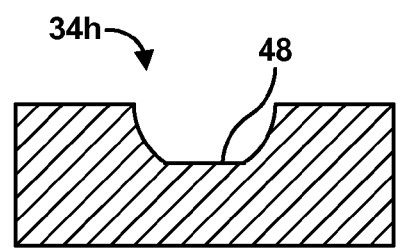

Features 34 may include, for example, depressions in surface 36, as shown in FIG. 1B. Features 34 may include a generally rectangular cross-section 38, as shown in FIG. 1B, or may include another cross-sectional profile. For example, as shown in FIG. 2A, a feature 34e may include a generally arcuate cross-section 42, such as a half-circle or another, lesser, portion of a circle. In other examples, as shown in FIGS. 2B-2D, a feature 34f may include a generally triangular cross-section 44, a feature 34g may include a generally trapezoidal cross-section 46, or a feature 34h may include a truncated arcuate cross-section 48. Such cross-sectional profiles are merely examples; other cross-sectional profiles are also possible and will be apparent to those of ordinary skill in the art.

As shown in FIG. 1B, features 34 may be formed proximate to at least one of cooling holes 20. Such an arrangement may provide an additional measure of thermal protection to substrate 26. For example, should a portion of TBC 28 delaminate due to thermal stress-initiated crack growth, the portion may be limited to a portion above a feature 34 or a portion above a plateau of substrate 26, as described above. In addition, because features 34 are formed proximate to cooling holes 20 the portion of substrate 26 or bond coat 30 that was protected by the now delaminated portion of TBC 28 may be cooled by air exiting one or more proximate cooling holes 20. This may provide thermal protection to the exposed portion of substrate 26 or bond coat 30 after delamination of the portion of TBC 28, which otherwise would not be possible if features 34 were not formed proximate to cooling holes 20. Cooling holes 20 may also help to cool substrate 26 when TBC 28 is substantially intact and attached to substrate 26.

Figure 3A:
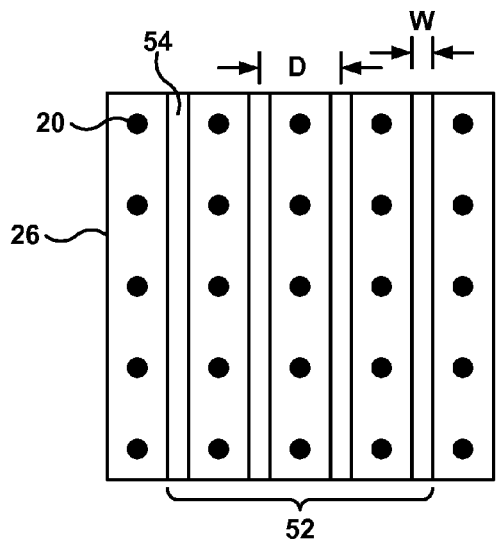
FIGS. 3A-3G are conceptual diagrams depicting exemplary substrates in which cooling holes and examples of arrays of features substantially aligned with the cooling holes are formed.

Features 34 may be formed in an array comprising a plurality of features 34. FIGS. 3A-3F illustrate a number of exemplary features 34 and arrays of features 34. For example, FIG. 3A shows an array of features 52 including a plurality of grooves 54. Grooves 54 are oriented substantially parallel to each other and are formed in substrate 26 proximate to cooling holes 20. In addition, grooves 54 are substantially aligned to cooling holes 20. In other words, in the embodiment illustrated in FIG. 3A, grooves are located between rows of cooling holes 20, and are approximately equidistant from the row of cooling holes 20 on either side of a respective one of grooves 54. Such an arrangement may segregate substrate 26 into a plurality of domains, each domain being located between adjacent grooves. As described above, this may improve thermal stress resistance of TBC 28 formed on substrate 26.

In some embodiments, grooves 54 may be approximately the same width W, as shown in FIG. 3A. In other embodiments, one or more grooves 54 may be a different width W than other grooves 54. In some embodiments, a width W of each of grooves 54 may be between approximately 0.005 inches and approximately 0.125 inches. In other embodiments, the width W of each of grooves 54 may be between approximately 0.010 inches and approximately 0.050 inches.

Adjacent grooves 54 may be spaced approximately evenly apart, or may be spaced different distances apart. The distance D between adjacent grooves 54 may be referred to as pitch, and in some embodiments, may vary between approximately 0.2 inches and approximately 0.3 inches. In some embodiments, the pitch may increase or decrease monotonically. In other embodiments, the pitch may increase and then decrease or may decrease and then increase. In yet other embodiments, as illustrated in FIG. 3A, the pitch may be approximately constant.

Grooves 54 may have a variety of cross-sectional shapes, including, for example, an arcuate, truncated arcuate, rectangular, trapezoidal, or triangular cross-section, as illustrated in FIGS. 1B and 2A-2D. Each of grooves 54 may have the same cross-sectional profile, or at least one of grooves 54 may have a different cross-sectional profile than another one of grooves 54. The depth of each of grooves 54 may be between approximately 0.004 inches and approximately 0.020 inches. In some embodiments, the depth of each of grooves 54 may be between approximately 0.004 inches and approximately 0.008 inches. Similar to the width W, the depth of each of grooves 54 may be approximately the same or the depth of at least one of grooves 54 may be different than at least one other of grooves 54. The depth of grooves 54 may substantially similar, may increase or decrease monotonically, may increase and then decrease, or may decrease and then increase.

Figure 3B:
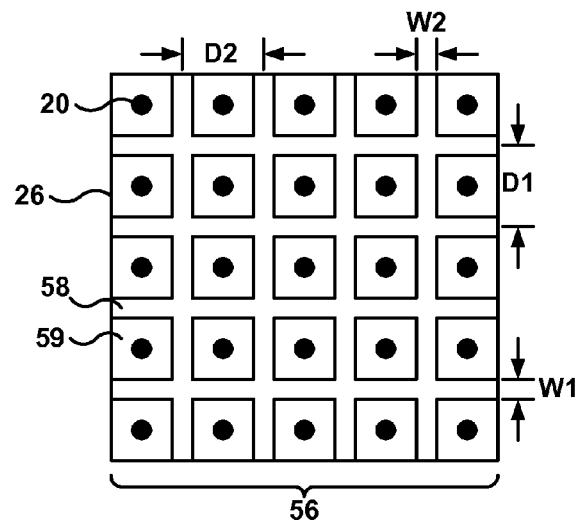

FIG. 3B illustrates an example of an array of features 56 that includes a grid 58 formed by a first plurality of grooves formed substantially parallel to each other and a second plurality of grooves formed substantially parallel to each other and substantially perpendicular to the first plurality of grooves. Grid 58 forms a depression in substrate 26 and defines a plurality of plateaus 59 in substrate 26. A respective one of cooling holes 20 is formed in each of plateaus 59. In this way, grid 58 segregates substrate 26 into a plurality of domains and impedes cracks from growing from one domain to an adjacent domain. Array of features 56 is formed proximate to and substantially aligned with cooling holes 20.

In some embodiments, each of the grooves oriented substantially horizontally in FIG. 3B may have a first width W1, and each of the grooves oriented substantially vertically in FIG. 3B may have a second width W2. In some embodiments, first width W1 may be the same as second width W2, while in other embodiments first width W1 may be different than second width W2. In addition, in some embodiments the width of at least one vertically oriented groove in grid 58 may be different than the width of another vertically oriented groove in grid 58. Similarly, the width of at least one horizontally oriented groove in grid 58 may be different than the width of another horizontally oriented groove in grid 58. In some embodiments, the width of horizontally or vertically oriented grooves in grid 58 may increase or decrease monotonically, while in other embodiments, the width of horizontally or vertically oriented grooves in grid 58 may increase and then decrease or decrease and then increase. The width (W1 or W2) of each of the grooves in grid 58 may be between approximately 0.005 inches and approximately 0.125 inches. In other embodiments, the width (W1 or W2) of each of the grooves in grid 58 may be between approximately 0.010 inches and approximately 0.050 inches.

Adjacent parallel grooves in grid 58 may be spaced approximately evenly apart, or may be spaced different distances apart. In some embodiments, the distance D1 or D2 between adjacent grooves 54 may vary between approximately 0.2 inches and approximately 0.3 inches. In some embodiments, the pitch may increase or decrease monotonically. In other embodiments, the pitch may increase and then decrease or may decrease and then increase. In yet other embodiments, as illustrated in FIG. 3B, the pitch may be approximately constant. In addition, in some embodiments the distance D1 between adjacent grooves in a first direction may be different than the distance D2 between adjacent grooves in a second direction. In some examples, the pitch in one direction may increase or decrease within grid 58, while the pitch in a second direction may be approximately constant.

Each of the grooves in grid 58 may have one of a variety of cross-sectional shapes, including, for example, an arcuate, truncated arcuate, rectangular, trapezoidal, or triangular cross-section, as illustrated in FIGS. 1B and 2A-2D. Each of the grooves in grid 58 may have the same cross-sectional profile, or at least one of the grooves in grid 58 may have a different cross-sectional profile than another one of the grooves in grid 58. The depth of each of the grooves may be between approximately 0.004 inches and approximately 0.020 inches. In some embodiments, the depth of each of the grooves may be between approximately 0.004 inches and approximately 0.008 inches. Similar to the width W, the depth of each of the grooves in grid 58 may be approximately the same or the depth of at least one of the grooves may be different than at least one other of the grooves. The depth of the grooves may increase or decrease monotonically, or may increase and then decrease or decrease and then increase. In some examples, the depth of the grooves oriented in a first direction, e.g., vertically in FIG. 3B, may be different than the depth of the grooves oriented in a second direction, e.g., horizontally in FIG. 3B. In addition, the depth of the grooves oriented in one direction may change within grid 58, while the depth of grooves oriented in a second direction within grid 58 may be approximately constant.

Figure 3C:
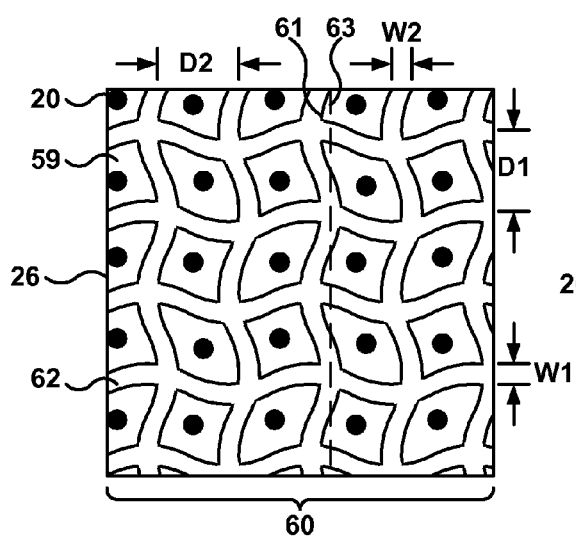

In other embodiments, as illustrated in FIG. 3C, an array of features 60 may include a grid of sinusoidal grooves 62. Grid 62 forms a depression in substrate 26 and defines a plurality of plateaus 59 in substrate 26. A respective one of cooling holes 20 is formed in each of plateaus 59. In this way, grid 62 segregates substrate 26 into a plurality of domains and impedes cracks from growing from one domain to an adjacent domain. Array of features 60 is formed proximate to and substantially aligned with cooling holes 20.

As described above, each of the grooves oriented in a first direction may have a first width W1, and each of the grooves oriented in a second direction may have a second width W2. In some embodiments, first width W1 may be the same as second width W2, while in other embodiments first width W1 may be different than second width W2. In addition, in some embodiments the width of at least one groove oriented in a first direction in grid 62 may be the same as or different than the width of another groove oriented in the first direction in grid 62. In some embodiments, the width of grooves oriented in a single direction in grid 62 may increase or decrease monotonically, while in other embodiments, the width of grooves oriented in a single direction in grid 62 may increase and then decrease or decrease and then increase. The width (W1 or W2) of each of the grooves in grid 62 may be between approximately 0.005 inches and approximately 0.125 inches. In other embodiments, the width (W1 or W2) of each of the grooves in grid 62 may be between approximately 0.010 inches and approximately 0.050 inches.

Adjacent parallel grooves in grid 62 may be spaced approximately evenly apart, or may be spaced different distances apart, similar to the grooves in grid 58 illustrated in FIG. 3B. In some embodiments, the distance D1 or D2 between adjacent grooves 54 may vary between approximately 0.2 inches and approximately 0.3 inches. The pitch may increase or decrease monotonically, may increase and then decrease, may decrease and then increase, or may be approximately constant. In addition, the distance D1 between adjacent grooves oriented in a first direction may be different than the distance D2 between adjacent grooves oriented in a second direction. In some examples, the pitch in one direction may increase or decrease within grid 62, while the pitch in a second direction may be approximately constant.

The amplitude, e.g., the distance from line 63 to a peak of groove 61, of the sinusoidal grooves in grid 62 may vary, and in some embodiments, may be between approximately 0.2 inches and approximately 0.3 inches. In other embodiments, the amplitude may be less than 0.2 inches or greater than approximately 0.3 inches.

Each of the grooves in grid 62 may have one of a variety of cross-sectional shapes, including, for example, an arcuate, truncated arcuate, rectangular, trapezoidal, or triangular cross-section, as illustrated in FIGS. 1B and 2A-2D. The cross-sectional profiles of each of the grooves may be the same, or may be different. The depth of each of the grooves may be between approximately 0.004 inches and approximately 0.020 inches. In some embodiments, the depth of each of the grooves may be between approximately 0.004 inches and approximately 0.008 inches. In addition, the depth of each of the grooves in grid 62 may be approximately the same or the depth of at least one of the grooves may be different than at least one other of the grooves. The depth of the grooves may increase or decrease monotonically, may increase and then decrease, or decrease and then increase. In some examples, the depth of the grooves oriented in a first direction may be different than the depth of the grooves oriented in a second direction. In addition, the depth of the grooves oriented in one direction may change within grid 62, while the depth of grooves oriented in a second direction within grid 62 may be approximately constant.

Figure 3D:
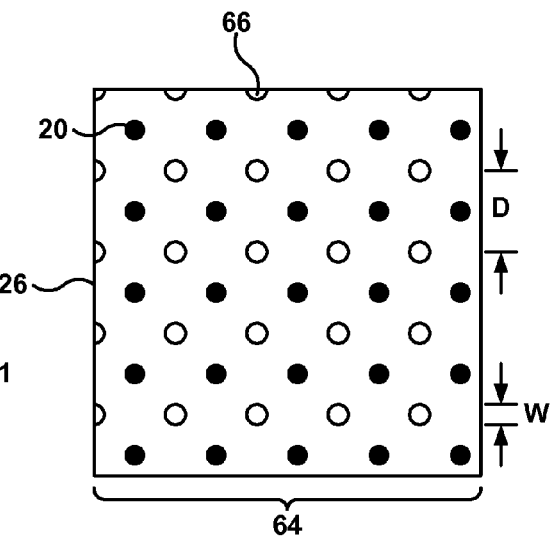
Figure 3E:
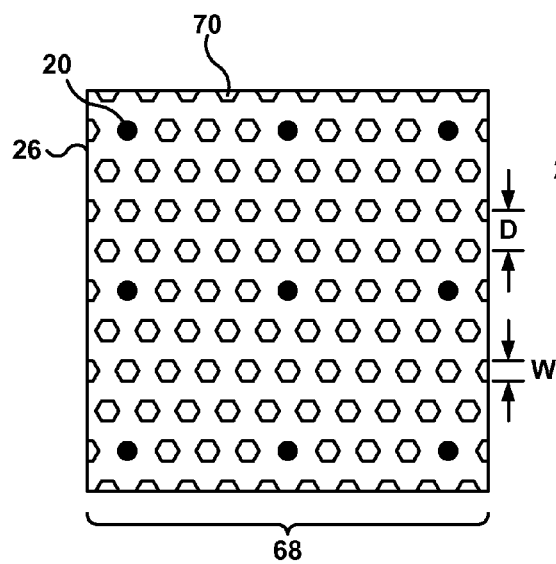
Figure 3F:
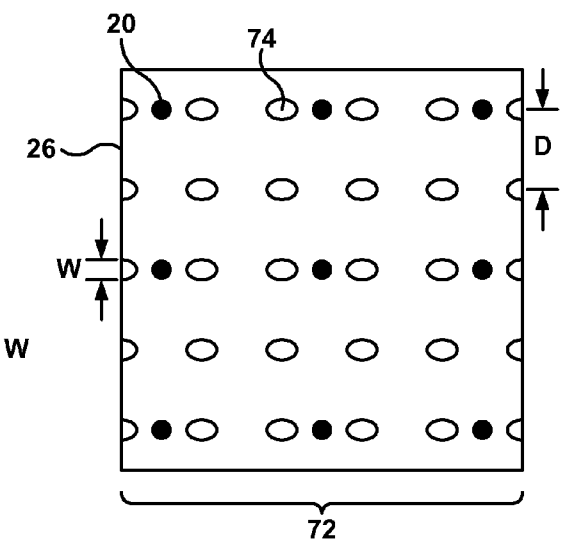

In some embodiments, a substrate may include an array of discrete features instead of an array of substantially continuous features. For example, FIG. 3D illustrates an array of features 64 that includes a plurality of circular depressions 66 formed in substrate 26. Similarly, FIG. 3E illustrates an array of features 68 that includes a plurality of hexagonal depressions 70 formed in substrate 26 and FIG. 3F illustrates an array of features 72 that includes a plurality of elliptical depressions 74 formed in substrate 26. The plurality of circular depressions 66 may be formed proximate to cooling holes 20. Circular depressions 66 are also substantially aligned with cooling holes 20, forming a pattern of rows of depressions 66 between adjacent rows of cooling holes 20.

As shown in FIGS. 3E and 3F, the plurality of hexagonal depressions 70 and plurality of elliptical depressions 74 form different patterns around cooling holes 20 than the plurality of circular depressions 66. Regardless of the particular pattern formed by circular, hexagonal, and elliptical depressions 66, 70, or 74 (collectively "depressions 66"), the depressions 66 are each formed proximate to and substantially aligned with cooling holes 20. The illustrated patterns and shapes of depressions 66 are merely examples, and other patterns and shapes of depressions 66 are contemplated. In addition, an array of features may include depressions 66 of different shapes, such as circular, hexagonal, or elliptical shapes (see FIG. 7D).

As described above, each of depressions 66 may have a diameter or width W. In some embodiments, the diameter or width W of depressions 66 may increase or decrease monotonically, while in other embodiments, the diameter or width W of depressions 66 may increase and then decrease or decrease and then increase. In other embodiments, the diameter or width W of depressions 66 may be substantially similar throughout array of features 64. In some embodiments, the diameter or width W of each of depressions 66 may be between approximately 0.005 inches and approximately 0.125 inches. In other embodiments, the diameter or width W of each of depressions 66 may be between approximately 0.010 inches and approximately 0.050 inches.

Depressions 66 may be spaced approximately evenly apart, or may be spaced different distances apart, similar to the grooves in grid 58 illustrated in FIG. 3B. The distance D between adjacent depressions 66 may vary in some embodiments between approximately 0.2 inches and approximately 0.3 inches. The pitch may increase or decrease monotonically, may increase and then decrease, may decrease and then increase, or may be approximately constant. In addition, the distance D between adjacent depressions 66 in a first direction may be different than the distance D between adjacent depressions 66 in a second direction. In some examples, the pitch in one direction may increase or decrease, while the pitch in a second direction may be approximately constant. In other examples, the pitch in two substantially perpendicular directions may each change, e.g., increase in both directions, decrease in both directions, or increase in a first direction and decrease in a second direction.

Each of depressions 66 may have one of a variety of cross-sectional shapes, including, for example, an arcuate, truncated arcuate, rectangular, trapezoidal, or triangular cross-section, as illustrated in FIGS. 1B and 2A-2D. The cross-sectional profiles of each of depressions 66 may be the same or may be different within an array of features 64, 68, or 72. The depth of each of depressions 66 may be between approximately 0.004 inches and approximately 0.020 inches. In some embodiments, the depth of each of depressions 66 may be between approximately 0.004 inches and approximately 0.008 inches. In addition, the depth of depressions 66 within an array of features 64, 68, or 72 may be approximately the same or the depth of at least one of the depressions 66 may be different than at least one other of the depressions 66. The depth of the depressions 66 may increase or decrease monotonically, may increase and then decrease, or decrease and then increase. In addition, the depth of the depressions 66 may change along one direction within an array of features 64, 68, or 72, while the depth of depressions 66 may or may not change along a second, substantially perpendicular direction within the array of features 64, 68, or 72.

Figure 3G:
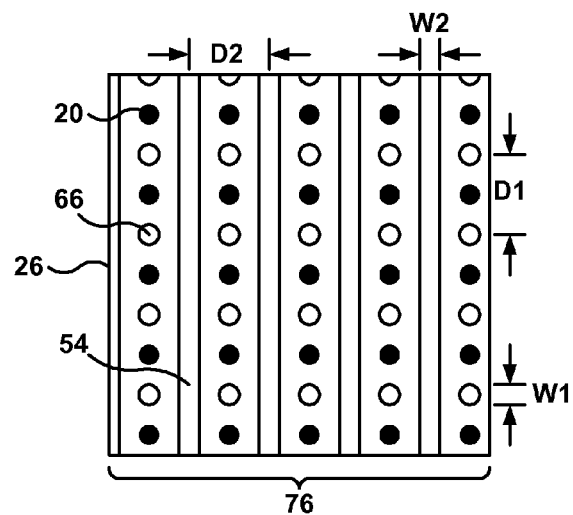

Although substantially continuous features, such as grooves 54, and discrete features, such as circular depressions 66, have been described separately, in some embodiments, continuous and discrete features may be utilized together. For example, FIG. 3G shows an array of features 76 including a plurality of grooves 54 and a plurality of circular depressions 66. Grooves 54 are oriented substantially parallel to each other and are formed in substrate 26 proximate to cooling holes 20. In addition, grooves 54 are substantially aligned to cooling holes 20. In other words, in the embodiment illustrated in FIG. 3G, grooves are located between rows of cooling holes 20, and are approximately equidistant from the row of cooling holes 20 on either side of a respective one of grooves 54. Such an arrangement may segregate substrate 26 into a plurality of domains, each domain being located between adjacent grooves. As described above, this may improve thermal stress resistance of TBC 28 formed on substrate 26.

In some embodiments, grooves 54 may be approximately the same width W2, as shown in FIG. 3G. In other embodiments, one or more grooves 54 may be a different width W2 than other grooves 54. In some embodiments, a width W2 of each of grooves 54 may be between approximately 0.005 inches and approximately 0.125 inches. In other embodiments, the width W2 of each of grooves 54 may be between approximately 0.010 inches and approximately 0.050 inches.

Adjacent grooves 54 may be spaced approximately evenly apart, or may be spaced different distances apart. The distance D2 between adjacent grooves 54 may be referred to as pitch, and in some embodiments, may vary between approximately 0.2 inches and approximately 0.3 inches. In some embodiments, the pitch may increase or decrease monotonically. In other embodiments, the pitch may increase and then decrease or may decrease and then increase. In yet other embodiments, as illustrated in FIG. 3G, the pitch may be approximately constant.

Grooves 54 may have one or more of a variety of cross-sectional shapes, including, for example, an arcuate, truncated arcuate, rectangular, trapezoidal, or triangular cross-section, as illustrated in FIGS. 1B and 2A-2D. Each of grooves 54 may have the same cross-sectional profile, or at least one of grooves 54 may have a different cross-sectional profile than another one of grooves 54. The depth of each of grooves 54 may be between approximately 0.004 inches and approximately 0.020 inches. In some embodiments, the depth of each of grooves 54 may be between approximately 0.004 inches and approximately 0.008 inches. Similar to the width W, the depth of each of grooves 54 may be approximately the same or the depth of at least one of grooves 54 may be different than at least one other of grooves 54. The depth of grooves 54 may increase or decrease monotonically, may increase and then decrease, or decrease and then increase.

The plurality of circular depressions 66 may be formed proximate to cooling holes 20. Circular depressions 66 are also substantially aligned with cooling holes 20, forming a pattern of rows of depressions 66 interspersed in rows of cooling holes 20.

Each of circular depressions 66 may have a diameter or width W1, which may be the same as or different than width W2 of grooves 54. In various embodiments, the diameter or width W1 of each of circular depressions 66 may be substantially similar, the diameter or width W1 of circular depressions 66 may increase or decrease monotonically, or the diameter or width W1 of circular depressions 66 may increase and then decrease or decrease and then increase. The diameter or width W1 of each of circular depressions 66 may be between approximately 0.005 inches and approximately 0.125 inches. In other embodiments, the diameter or width W1 of each of circular depressions 66 may be between approximately 0.010 inches and approximately 0.050 inches.

Circular depressions 66 may be spaced approximately evenly apart, or may be spaced different distances apart, similar to the grooves in grid 58 illustrated in FIG. 3B. The distance D1 between adjacent circular depressions 66 may vary in some embodiments between approximately 0.2 inches and approximately 0.3 inches. The pitch may increase or decrease monotonically, may increase and then decrease, may decrease and then increase, or may be approximately constant. In addition, the distance D1 between adjacent circular depressions 66 in a first direction may be the same as or different than the distance D1 between adjacent circular depressions 66 in a second direction. In some examples, the pitch in one direction may increase or decrease, while the pitch in a second direction may be approximately constant. In other examples, the pitch in two substantially perpendicular directions may each change, e.g., increase in both directions, decrease in both directions, or increase in a first direction and decrease in a second direction.

Each of circular depressions 66 may have one of a variety of cross-sectional shapes, including, for example, an arcuate, truncated arcuate, rectangular, trapezoidal, or triangular cross-section, as illustrated in FIGS. 1B and 2A-2D. The cross-sectional profiles of each of circular depressions 66 may be the same as or different than the cross-sectional profiles of grooves 54, and may be the same or may be different within array of features 76. The depth of each of circular depressions 66 may be between approximately 0.004 inches and approximately 0.020 inches. In some embodiments, the depth of each of circular depressions 66 may be between approximately 0.004 inches and approximately 0.008 inches.

In addition, the depth of circular depressions 66 within array of features 76 may be approximately the same or the depth of at least one of the circular depressions 66 may be different than at least one other of the circular depressions 66. The depth of the circular depressions 66 may increase or decrease monotonically, may increase and then decrease, or decrease and then increase. In addition, the depth of the circular depressions 66 may change along one direction within array of features 76, while the depth of circular depressions 66 may or may not change along a second, substantially perpendicular direction within array of features 76.

Figure 4:
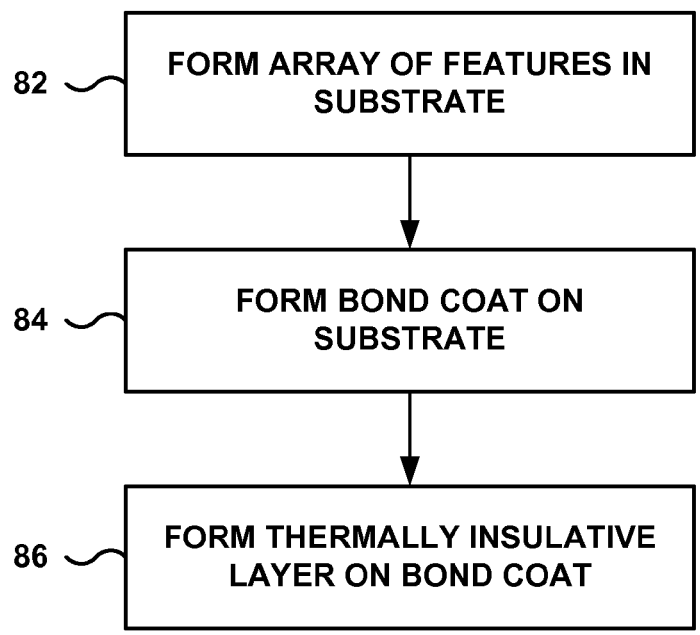
FIG. 4 is a flow diagram of an exemplary technique of forming an article including a substrate, an array of features formed in the substrate and substantially aligned with cooling holes formed in the substrate, and a bond coat and thermal barrier coating formed on the substrate and the array of features.

FIG. 4 is a flow diagram of an exemplary technique of forming an article including a substrate having a plurality of features formed therein and a TBC formed on the substrate. For the sake of clarity, the technique of FIG. 4 will be described with reference to gas turbine engine combustor section 10 shown in FIGS. 1A and 1B, but it will be understood that the technique of FIG. 4 may be utilized on another component of a high temperature mechanical system, such as, for example, a turbine blade track, a turbine seal segment, an airfoil, or the like.

Initially, an array of features 34 is formed in substrate 26 (82). The array may include a plurality of features 34, which may be formed proximate to and substantially aligned with cooling holes 20 formed in substrate 26. The features 34 may include, for example, linear grooves or sinusoidal grooves, a grid formed by linear or sinusoidal grooves, circular depressions, hexagonal depressions, elliptical depressions, or combinations of these features 34. The features may be formed by, for example, chemical etching, photolithography, laser machining, electrochemical machining, electro-discharge machining, micromachining, vibropeening, or the like. In chemical etching and photolithography, portions of substrate 26 are exposed to a chemical that reacts with substrate 26 to remove material from substrate 26. By controlling the locations that are etched by the chemical and the amount of time for which substrate 26 is exposed to the chemical, the depth and shape of the features 34 may be controlled. The locations that are etched may be controlled by covering portions of substrate 26 that are not to be etched with a layer of material that is inert with respect to the chemical etchant.

In laser machining, a source of electromagnetic energy, such as an excimer laser, is used to generate a series of electromagnetic pulses of a wavelength that is absorbed by substrate 26. The intensity of the pulses is sufficient to cause portions of substrate 26 that absorb the energy to vaporize. Sequential exposure of different portions of substrate 26 may be used to vaporize substrate 26 and form features 34.

Other methods of forming features 34 may include mechanical removal of portions of substrate 26 by, for example, a pressurized stream of water, an abrasive, water carrying an abrasive, or a tool that is sufficiently hard to deform substrate 26 or remove material from substrate 26.

Once the array of features 34 is formed in the substrate 26 (82), a bond coat 30 may be deposited on substrate 26, including the array of features 34 (84). As described above, bond coat 30 may include an alloy, such as an MCrAlX alloy, which may or may not be modified by inclusion of Pt, another precious metal group element, or a refractory element.

Bond coat 30 may be formed on substrate by, for example, a thermal spraying technique, such as air plasma spraying (APS), low pressure plasma spraying (LPPS), high velocity oxy-fuel spraying (HVOF), electroplating, or the like. Bond coat 30 may be formed to a thickness between approximately 0.003 inches and approximately 0.020 inches. In some embodiments, bond coat 30 may include a thickness between approximately 0.003 inches and 0.008 inches. Bond coat 30 may substantially reproduce the geometry of substrate 26, including features 34.

After formation of bond coat 30, thermally insulative layer 32 may be formed on bond coat 30 (86). Thermally insulative layer 32 may comprise at least one of a variety of materials, including, for example, yttria-stabilized zirconia, yttria-stabilized hafnia, a rare earth oxide, a rare earth oxide-stabilized zirconia, a rare earth oxide-stabilized hafnia, a silicate, a zirconate, an aluminate, or combinations thereof. Thermally insulative layer 32 may be formed by plasma spraying.

Thermally insulative layer 32 may be formed as a porous layer, with a porosity ranging from approximately 5% to approximately 40%. The porosity of thermally insulative layer 32 may reduce heat transfer compared to a non-porous thermally insulative layer 32. In some embodiments, thermally insulative layer 32 may be formed over bond coat 30 using plasma-spraying. The thickness of thermally insulative layer 32 may range from approximately 0.005 inches and approximately 0.04 inches. In some embodiments, the thickness of thermally insulative layer 32 may range from approximately 0.005 inches to approximately 0.02 inches.

Figure 5:
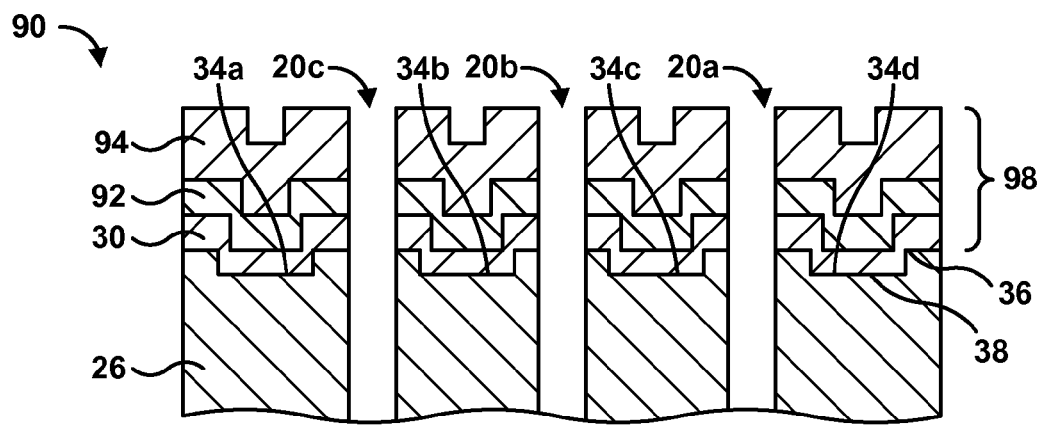
FIG. 5 is a cross-sectional diagram of an exemplary article including a thermal barrier coating comprising a first and a second thermally insulative layer formed on a substrate including features formed in a surface of the substrate.

In some embodiments, forming a thermally insulative layer 32 on bond coat 30 (86) may include forming a first thermally insulative layer and a second thermally insulative layer. For example, FIG. 5 shows an article 90 including a substrate 26, a bond coat 30 formed on substrate 26, a first thermally insulative layer 92 formed on bond coat 30, and a second thermally insulative layer 94 formed on first thermally insulative layer 92.

First and second thermally insulative layers 92 and 94 may be formed with different porosities. For example, first thermally insulative layer 92 may be formed with a porosity ranging between 5% and 25%, preferably between 5% and 15%. Second thermally insulative layer 94 may be formed with a porosity between 5% and 40%, preferably between 5% and 20%. In some embodiments, the porosity of the first and second thermally insulative layers 92 and 94 may be approximately the same, and in other embodiments, the porosity of the first and second thermally insulative layers 92 and 94 may be different.

In some embodiments, first thermally insulative layer 92 may comprise a first material and second thermally insulative layer 94 may comprise a second material. The first and second materials may be different, and may be selected to provide desired properties. For example, the first material may be selected to have a coefficient of thermal expansion that more closely matches the coefficient of thermal expansion of substrate 26 or bond coat 30, while the second material has a coefficient of thermal expansion that is not as similar to the coefficient of thermal expansion of substrate 26. In other embodiments, first thermally insulative layer 92 and second thermally insulative layer 94 may include the same materials.

Each of first thermally insulative layer 92 and second thermally insulative layer 94 may be formed to a thickness between approximately 0.001 inches and 0.02 inches. In some embodiments, each of first and second thermally insulative layers 92 and 94 may be formed to thicknesses between 0.001 inches and 0.01 inches. First and second thermally insulative layers 92 and 94 may comprise similar thicknesses or different thicknesses.

Figure 6:
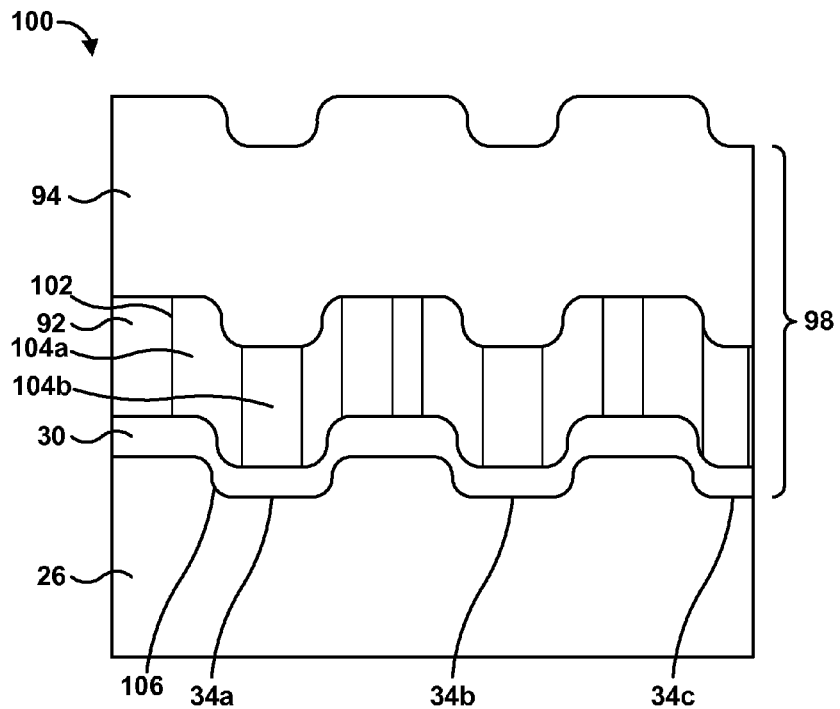
FIG. 6 is a cross-sectional diagram of an exemplary article including a bond coat and a thermal barrier coating a first thermally insulative layer comprising a plurality of substantially vertical cracks and a second thermally insulative layer.

In some embodiments, as illustrated in FIG. 6, first thermally insulative layer 92 may be formed with a plurality of substantially vertical cracks 102, e.g., cracks oriented substantially normal to surface 36 of substrate 26. The plurality of substantially vertical cracks 102 may further contribute to thermal stress tolerance. While not wishing to be bound by any particular theory, substantially vertical cracks 102 may improve mechanical compliance of first thermally insulative layer 92 compared to a first thermally insulative layer 92 that does not include substantially vertical cracks 102. Substantially vertical cracks 102 may facilitate relative motion between adjacent domains 104a and 104b (collectively "domains 104") of first insulative layer 92, for example, during expansion and/or contraction of bond coat 30 and first thermally insulative layer 92 due to temperature changes. This may lower the out-of-plane stress due to a thermal expansion mismatch across the interface of bond coat 30 and first thermally insulative layer 92, and may improve thermal stress tolerance of bond coat 98.

Substantially vertical cracks 102 may be formed in first thermally insulative layer 92 during deposition of first thermally insulative layer 92 on bond coat 30. For example, when first thermally insulative layer 92 is deposited using plasma spraying, first thermally insulative layer 92 may be heated to a high temperature and cooled rapidly to thermally shock layer 92 and form substantially vertical cracks 102. As another example, substantially vertical cracks 102 may be formed by depositing first thermally insulative layer 92 in relatively thick layers, which builds stress in first thermally insulative layer 92. This stress buildup may result in formation of substantially vertical cracks 102, which release the stress. In other examples, first thermally insulative layer 92 may be formed of a plurality of sub-layers in which adjacent layers microweld to each other during plasma deposition and grow substantially continuous vertical grains with substantially vertical cracks 102 formed between the grains.

FIG. 6 also illustrates features 34a, 34b, and 34c including rounded edges 106. Rounded edges 106 may also act to mitigate effects of stress induced by thermal cycling of article 100. Rounded edges 106 may reduce stress concentration at the edges of features 34 compared to features 34 having sharp or rectangular edges. By reducing stress concentration, rounded edges 106 may increase resistance to formation of cracks at edges of features 34, thus contributing to thermal stress resistance of bond coat 98. One method of forming rounded edges 106 is by chemical etching.

While the forgoing description has been primarily directed to forming an array of features proximate to and substantially aligned with cooling holes in a substrate, other techniques may be used to improve thermal stress resistance of an article. For example, an article may include a first array of features formed in a first location of a substrate and a second array of features formed in a second location in the substrate. Each of the first and second locations may be selected based on thermal stresses that the first and second locations are predicted to experience during use. The predicted thermal stresses may be determined based on experimental data, e.g., data collected from previously used or tested components, or may be predicted by theoretical modeling (e.g., finite element analysis) of thermal stresses on the component.

Figure 7A:
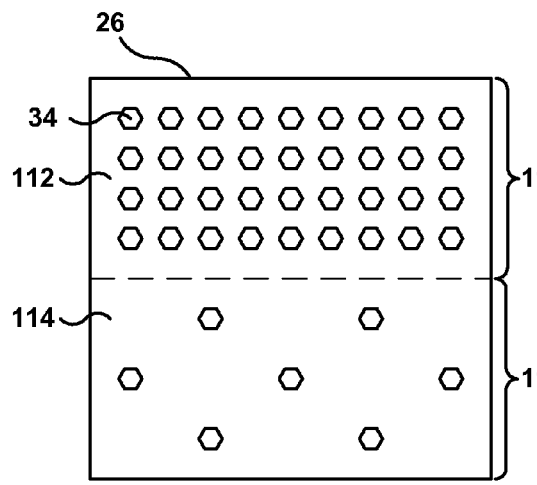

For example, FIGS. 7A-7D are conceptual diagrams illustrating various examples of first and second arrays of features formed in a substrate based on predicted thermal stresses experienced by first and second locations of the substrate. FIG. 7A illustrates a substrate 26 having a first array 116 of features 34 formed in a first location 112 of substrate 26 and a second array 118 of features 34 formed in a second location 114 of substrate 26. In the embodiment illustrated in FIG. 7A, each of the features 34 comprises a hexagonal depression.

In some embodiments, the predicted thermal stress at first location 112 may be greater than the predicted thermal stress at second location 114. The thermal stresses experienced by first location 112 and second location 114, respectively, may be due to temperature changes, which cause thermal expansion and/or contraction of substrate 26 and a TBC (not shown in FIG. 7A) formed on substrate 26. First location 112 may experience greater thermal stress due to, for example, the position of first location 112 within a high temperature mechanical system, while second location 114 may experience lesser thermal stress because of its position within the high temperature mechanical system.

Accordingly, first location 112 may have formed therein a first array 116 of features 34, which may provide greater thermal stress mitigation than second array 118 of features 34 formed in second location 114. For example, in the embodiment illustrated in FIG. 7A, features 34 in first array 116 are formed in a more closely-spaced pattern than features 34 in second array 118. Such a pattern divides substrate 26 into smaller domains, and may better mitigate thermal stress than the larger spacing of features 34 in second array 118. Second array 118 may still provide thermal stress mitigation to second location 114 of substrate 26.

Although features 34 in FIG. 7A are depicted as being uniform in size and shape, in some embodiments a single array 116 or 118 may include a pattern of features 34 including more than one shape and/or more than one depth. Examples of arrays including different shapes and depths are illustrated in FIGS. 7D and 8, respectively. Alternatively or additionally, a single array 116 or 118 may include a pattern in which a size of the features 34 changes throughout the array 116 or 118. For example, the size of features 34 may monotonically increase in one or two perpendicular dimensions, or may increase and then decrease in one or two perpendicular dimensions.

Figure 7B:
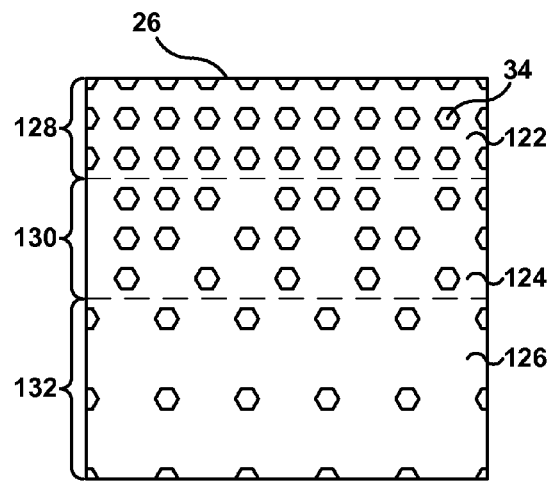

As FIG. 7B illustrates, in some embodiments substrate 26 may include a transitional region 124, which includes a transitional array 130 of features 34. Transitional region 124 is located between a first location 122, which includes a first array 128 of features 34, and a second location 126, which includes a second array 132 of features 34. Within transitional array 130, the spacing, or pitch, between adjacent features 34 may change substantially continuously from the spacing of features 34 in first array 128 to the spacing of features 34 in second array 132.

For example, to transition from first array 128 to second array 132, each subsequent row within transitional array includes fewer features 34, and an increased spacing between adjacent features 34 within the row. In this way, transitional array may smooth the transition from first array 128 to second array 132. Transitional array 130 may provide thermal stress mitigation that is intermediate between first array 128 and second array 132, and which changes as the features 34 or spacing of features 34 within transitional array 130 changes. For example, the thermal stress mitigation provided by transitional array 130 may be greater proximate to first array 128 than the thermal stress mitigation provided by transitional array 130 proximate to second array 132.

Although FIG. 7B illustrates only the pitch of features 34 changing within transitional array 130, in other embodiments, a size, depth, or shape of features 34 may change from being similar to features 34 within first array 128 to being similar to features 34 within second array 132. In some embodiments, two or more characteristics of features 34, e.g., size, shape, depth, or pitch, may change within transitional array 130.

FIG. 7C illustrates a substrate 26 including a first array 148 of features 34 comprising parallel grooves in substrate 26 formed at a first location 142 of substrate 26. Substrate 26 also includes a second array 152 of features 34 formed at a second location 146 of substrate 26, and a transitional array 150 of features 34 formed in a transitional region 144 of substrate 26. First array 148 includes a first spacing between adjacent features 34, and second array 152 includes a first spacing between adjacent features 34. Transition array 150 includes spacing between adjacent features 34 that changes from being similar to spacing between features 34 in first array 148 to being similar to spacing between features 34 in second array 152. In this way, transitional array 150 provides a substantially continuous transition from the patter of features 34 in first array 148 to the pattern of features 34 in second array 152.

While FIGS. 7A-7C illustrate first and second arrays of features 34 that include similar features 34, in some embodiments the first and second arrays may include different features 34, as illustrated in FIG. 7D. In FIG. 7D, substrate 26 includes a first array 166 comprising hexagonal depressions 34$i$ and elliptical depressions 34$j$ formed at a first location 162 of substrate 26 and a second array 168 of circular depressions 34$k$ formed at a second location 164 of substrate 26. In addition, substrate 26 includes a plurality of cooling holes 20 formed at both first location 162 and second location 164. Cooling holes 20 may be utilized along with a first array of features 34 and a second array of features 34 in any of the embodiments described herein.

First array 166 includes hexagonal depressions 34$i$ and elliptical depressions 34$j$. In other embodiments, other combinations of features may be utilized in a single array, e.g., first array 116, and more than two features may be utilized in a single array. Hexagonal depressions 34$i$ and elliptical depressions 34$j$ are shown in FIG. 7D solely as an example of one combination of features. In addition, although the pitch between adjacent features 34 within first array 166 is shown as being substantially uniform, in other embodiments, the pitch may change within first array 166.

In the illustrated embodiment, both the pitch and the shape of features 34 changes between first array 166 and second array 168. Once again, circular depressions 34$k$ are merely exemplary, and any shape of features 34 may be used in second array 168.

In some embodiments, instead of the shape and/or pitch of features 34 changing between first array 166 and second array 168, the shape and/or pitch of features 34 may not change, and the size and/or depth of features 34 may change between first array 166 and second array 168. In fact, any combination of characteristics of features 34, e.g., size, shape, pitch, depth, cross-sectional shape, or the like, may change or may not change between first array 166 and 168.

Additionally, as illustrated in FIG. 7D, the pitch of cooling holes 20 may change between first location 162 and second location 164. In other embodiment, the pitch of cooling holes 20 may not change between first location 162 and second location 164. In some embodiments, other characteristics of cooling holes, such as a size or shape, may change between first location 162 and second location 164.

Although not depicted in FIGS. 7A-7D, in some embodiments, a first array of features may include substantially continuous features (e.g., grooves 54 of FIG. 3A), while a second array of features includes discrete features (e.g., circular depressions 66 of FIG. 3D). Other combinations of features and arrays of features 34 will be apparent to those of skill in the art.

Each of the characteristics of the features illustrated in FIGS. 7A-7D, such as size, shape, cross-sectional profile, depth, pitch, or the like, may be selected from among the respective examples described above with respect to FIGS. 1-6. However, the characteristics of the features are not so limited, and may include characteristics not described above. For example, the size, depth, or pitch may be greater than the ranges described above or lesser than the ranges described above, in addition to falling within the ranges described above.

Additionally and optionally, in some embodiments, the composition of the TBC may be different in a first location (e.g., first location 162) and a second location (e.g., second location 164). For example, in a location of an article that is predicted to experience lower thermal stress, a TBC may be utilized that provides less thermal insulation but is less costly. On the other hand, in a location of an article that is predicted to experience greater thermal stress, a TBC may be utilized that provides greater thermal insulation but is more costly. In some embodiments, more than two TBC compositions may be utilized in a single article. The composition of the TBC may be selected in combination with the arrays of features 34 to provide tailored thermal stress mitigation at different locations of a single article.

FIG. 8 is a cross-sectional diagram of an exemplary substrate 26 that includes a plurality of features 34 formed in surface 36. Features 34 may all be in a single array, e.g., a first array 166. As shown in FIG. 8, the features 34 include both a depth and a size (width) that changes within the array. For example, first feature 34$l$ includes a depth d1 and a width w1, which are each the smallest of any of features 34. Second feature 34$m$ includes a depth d2 and a width w2, which are greater than depth d1 and width w1, respectively. Third feature 34$n$ includes a depth d3 and a width w3, which are greater than depth d2 and width w2, respectively. Finally, fourth feature 34$o$ includes a depth d4 and a width w4, which are greater than depth d3 and width w3, respectively. Features 34$l$, 34$m$, 34$n$, and 34$o$ are arranged in a repeating pattern, increasing in depth and width, then decreasing in depth and width.

The embodiment illustrated in FIG. 8 is merely illustrative. In other embodiments, the depth and width may change independently, e.g., one may change and the other not change, one may increase and the other decrease, or the like. Additionally or alternatively, the depth and/or width may increase or decrease monotonically. As described above, in addition or alternative to the depth or width changing, a shape, cross-sectional profile, or pitch of features 34 may change within an array, e.g., first array 166.

Figure 9:
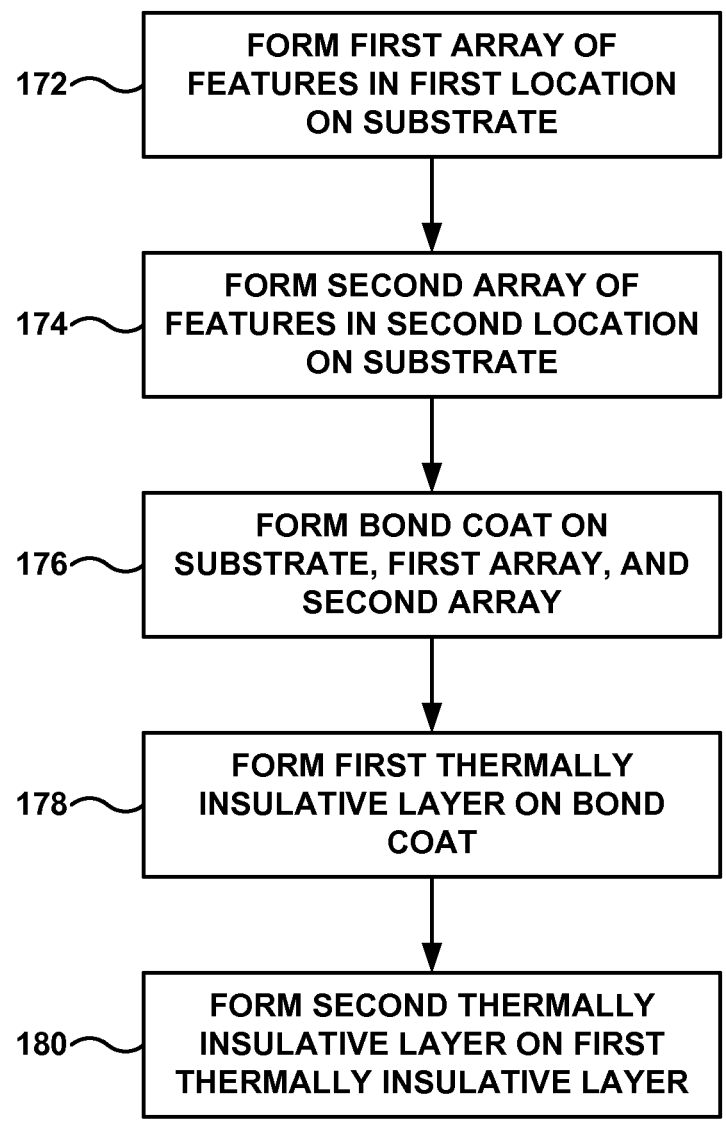
FIG. 9 is a flow diagram of an exemplary technique of forming an article including a first array of features in a first location on a substrate and a second array of features in a second location on the substrate.

FIG. 9 is a flow diagram of an exemplary technique for forming an article including a first array of features in a first location of a substrate and a second array of features in a second location of the substrate. The technique shown in FIG. 9 will be described with reference to FIG. 7A for the sake of convenience, but will be understood to be applicable to other embodiments that include a first array and second array of features formed in a substrate.

Initially, a first array 116 of features 34 is formed in a first location 112 on a substrate 26 (172). In some embodiments, substrate 26 may include cooling holes 20, while in other embodiments, substrate 26 may not include cooling holes 20. The features 34 may include hexagonal depressions, as illustrated in FIG. 7A, or may include, for example, linear grooves or sinusoidal grooves, a grid formed by linear or sinusoidal grooves, circular depressions, elliptical depressions, or combinations of these features 34. The features 34 may be formed by, for example, chemical etching, photolithography, laser machining, electrochemical machining, electro-discharge machining, micromachining, vibropeening, or the like.

As described above, first location 112 may be selected or determined based on a prediction of thermal stress that substrate 26 will experience during use. In some embodiments, the prediction of thermal stress may be made based on experimental evidence or data, such as data collected during use of a similar substrate under similar condition to those which substrate 26 will experience. In other embodiments, the prediction of thermal stress may be made based on theoretical stress calculations based on material properties of substrate 26, bond coat 30 (see FIG. 1B), and/or thermally conductive layer 32 (see FIG. 1B) (e.g., using finite element analysis).

Once first array 116 is formed in substrate 26 (172), second array 118 of features 34 may be formed in a second location 114 of substrate 26 (174). A process similar to that used to form first array 116 may be used to form second array 118. In some embodiments, second array 118 may be formed substantially simultaneously with first array 116. In other embodiments, second array 118 may be formed before or after first array 116.

Similar to first location 112, second location 114 may be selected or determined based on a prediction of thermal stress that substrate 26 will experience during use. In some embodiments, the prediction of thermal stress may be made based on experimental evidence or data, such as data collected during use of a similar substrate under similar condition to those which substrate 26 will experience. In other embodiments, the prediction of thermal stress may be made based on theoretical stress calculations based on material properties of substrate 26, bond coat 30 (see FIG. 1B), and/or thermally conductive layer 32 (see FIG. 1B) (e.g., using finite element analysis).

As described above, first array 116 and second array 118 may include first and second patterns of features 34, respectively. The patterns may be defined by a shape, size, depth, pitch, or cross-sectional profile of the features 34. In some embodiments, only one of these characteristics may change between first array 116 and second array 118, while in other embodiments, two or more of these characteristics may change between first array 116 and second array 118.

Although not shown in FIG. 9, in some embodiments the technique may optionally include forming a transitional array (e.g., transitional array 130, FIG. 7B) in substrate 26. As described above, the transitional array may include a pattern which transitions from being similar to the pattern in first array 116 proximate to first array 116 and being similar to second array 118 proximate to second array 118. The transitional array may be formed by any of the processes used to form first array 116 and/or second array 118. In some embodiments, the transitional array may be formed substantially simultaneously with first array 116 and/or second array 118. In other embodiments, transitional array may be formed sequentially with first array 116 and/or second array 118.

Once first array 116, second array 118 and, optionally, the transitional array have been formed in substrate 26, a bond coat 30 (FIG. 1B) may be formed on substrate 26, including features 34 in first array 116 and second array 118 (176). As described above, bond coat 30 may include an alloy, such as an MCrAlX alloy, which may or may not be modified by inclusion of Pt, another precious metal group element, or a refractory metal.

Bond coat 30 may be formed on substrate 26 by, for example, a thermal spraying technique, such as plasma spraying, cathodic arc deposition, electron beam physical vapor deposition, electroplating, or the like. Bond coat 30 may be formed to a thickness between approximately 0.003 inches and approximately 0.020 inches. In some embodiments, bond coat 30 may include a thickness between approximately 0.003 inches and 0.008 inches. Bond coat 30 may substantially reproduce the geometry of substrate 26, including features 34.

After formation of bond coat 30, a first thermally insulative layer 92 (FIG. 5) may be formed on bond coat 30 (178). First thermally insulative layer 92 may comprise at least one of a variety of materials, including, for example, yttria-stabilized zirconia, yttria-stabilized hafnia, a rare earth oxide, a rare earth oxide-stabilized zirconia, a rare earth oxide-stabilized hafnia, a silicate, a zirconate, an aluminate, or combinations thereof.

First thermally insulative layer 92 may be formed as a porous layer, with a porosity ranging from approximately 5% to approximately 25%. In some embodiments, the porosity of first thermally insulative layer 92 may range from approximately 5% to approximately 15%. The porosity of thermally insulative layer 32 may reduce heat transfer compared to a non-porous thermally insulative layer 32. In some embodiments, first thermally insulative layer 92 may be formed over bond coat 30 using plasma-spraying. The thickness of first thermally insulative layer 92 may range from approximately 0.001 inches and approximately 0.02 inches. In some embodiments, the thickness of first thermally insulative layer 92 may range from approximately 0.001 inches to approximately 0.01 inches. In some embodiments, as described with respect to FIG. 6, first thermally insulative layer 92 may be formed with a plurality of substantially vertical cracks 102.

After formation of first thermally insulative layer 92, second thermally insulative layer 94 may be formed on first thermally insulative layer 92 (180). Second thermally insulative layer 94 may comprise at least one of a variety of materials, including, for example, yttria-stabilized zirconia, yttria-stabilized hafnia, a rare earth oxide, a rare earth oxide-stabilized zirconia, a rare earth oxide-stabilized hafnia, a silicate, a zirconate, an aluminate, or combinations thereof. Second thermally insulative layer 94 may be deposited by plasma spraying.

In some embodiments, first thermally insulative layer 92 may comprise a first material and second thermally insulative layer 94 may comprise a second material. The first and second materials may be different, and may be selected to provide desired properties. For example, the first material may be selected to have a coefficient of thermal expansion that more closely matches the coefficient of thermal expansion of substrate 26 or bond coat 30, while the second material has a coefficient of thermal expansion that is not as similar to the coefficient of thermal expansion of substrate 26. In other embodiments, first thermally insulative layer 92 and second thermally insulative layer 94 may include the same materials.

Second thermally insulative layer 94 may be formed with a porosity between 5% and 40%, preferably between 5% and 20%. In some embodiments, the porosity of the first and second thermally insulative layers 92 and 94 may be approximately the same, and in other embodiments, the porosity of the first and second thermally insulative layers 92 and 94 may be different. Second thermally insulative layer 94 may be formed to a thickness between approximately 0.001 inches and 0.04 inches. In some embodiments, second thermally insulative layer 94 may be formed to thicknesses between 0.001 inches and 0.01 inches. First and second thermally insulative layers 92 and 94 may comprise similar thicknesses or different thicknesses.

In some embodiments, as illustrated in FIG. 6, first thermally insulative layer 92 may be formed with a plurality of substantially vertical cracks 102, e.g., cracks oriented substantially normal to surface 36 of substrate 26. The plurality of substantially vertical cracks 102 may further contribute to thermal stress tolerance. While not wishing to be bound by any particular theory, substantially vertical cracks 102 may improve mechanical compliance of first thermally insulative layer 92 compared to a first thermally insulative layer 92 that does not include substantially vertical cracks 102. Substantially vertical cracks 102 may facilitate relative motion between adjacent domains 104a and 104b (collectively "domains 104") of first insulative layer 92, for example, during expansion and/or contraction of bond coat 30 and first thermally insulative layer 92 due to temperature changes. This may lower the out-of-plane stress due to a thermal expansion mismatch across the interface of bond coat 30 and first thermally insulative layer 92, and may improve thermal stress tolerance of bond coat 98.

Substantially vertical cracks 102 may be formed in first thermally insulative layer 92 during deposition of first thermally insulative layer 92 on bond coat 30. For example, when first thermally insulative layer 92 is deposited using plasma spraying, first thermally insulative layer 92 may be heated to a high temperature and cooled rapidly to thermally shock layer 92 and form substantially vertical cracks 102. As another example, substantially vertical cracks 102 may be formed by depositing first thermally insulative layer 92 in relatively thick layers, which builds stress in first thermally insulative layer 92. This stress buildup may result in formation of substantially vertical cracks 102, which release the stress. In other examples, first thermally insulative layer 92 may be formed of a plurality of sub-layers in which adjacent layers microweld to each other during plasma deposition and grow substantially continuous vertical grains with substantially vertical cracks 102 formed between the grains.

Although various features and arrays of features formed in a surface of a substrate have been described in different embodiments, the illustrated embodiments will be understood to not limit the combinations and configurations of features and arrays. For example, although different cross-sectional profiles were described primarily with respect to FIGS. 2A-2D, it will be understood that any of the features or arrays described herein may comprise any cross-sectional profile. Other combinations of features and arrays described herein will be apparent to those of skill in the art, and fall within the scope of the following claims.

In addition, while the disclosure has primarily directed to features formed in a combustor liner of a gas turbine engine, the techniques may be applied to other components of high temperature mechanical systems. For example, the features and methods of forming features described herein may be applied to an airfoil in a gas turbine engine, a turbine seal segment in a gas turbine engine, or a blade track in a gas turbine engine. Other components that may benefit from use of the techniques described herein will be apparent to those of ordinary skill in the art.

For example, while the examples described above primarily relate to techniques for mitigating thermal stress in a combustion chamber article coated with a thermal barrier coating (TBC), examples of the disclosure may be applicable to different types of coatings, either on combustion chamber articles or different types of articles. Any coated surface subject to forces that promote detachment between a coating layer and an underlying substrate may benefit from one or more of the techniques described herein. For example, as briefly described above, airfoils, including turbine blade airfoils for a gas turbine engine, can utilize the features and arrays of features disclosed in the present application.

Blade airfoils may be subject to widely varying temperatures and erosive chemical species during operation. In some examples, blade airfoils are also subject to high shear forces. For example, blade airfoils may be configured so that the tips of the airfoils abrade into a surrounding blade track or shroud during operation, e.g., to create a seal that prevents fluid from bypassing the blades and reducing the efficiency of the mechanical system. The abrading action can create high shear forces and elevated temperatures as kinetic energy is converted into mechanical and thermal energies. To reduce or eliminate the effects of these various forces, a blade airfoil may receive one more coatings, e.g., on the entire blade airfoil or on a blade airfoil tip alone, that function to protect the blade and/or blade tip during operation. However, the coatings that protect the blade during operation may also be subject to forces that promote detachment between a coating layer and an underlying blade surface. If a coating layer detaches from the underlying blade surface, the protection provided by the coating may be lost, potentially reducing the service life of the blade and, more generally, the mechanical system which includes the blade.

While one or more of the techniques described herein may increase adherence between a coating layer and a blade surface, one or more example techniques described herein may be applied to a blade airfoil to minimize crack growth when incipient detachment appears between a coating layer and blade surface. Further, one or more example techniques may be used to increase mechanical adhesion between a coating layer and a blade surface, thus preventing or minimizing crack growth in the first instance. While the techniques can be employed on any surface, a blade airfoil tip subject to high tensile and shear stresses may benefit from the features and arrays of features described.

Figure 10A:
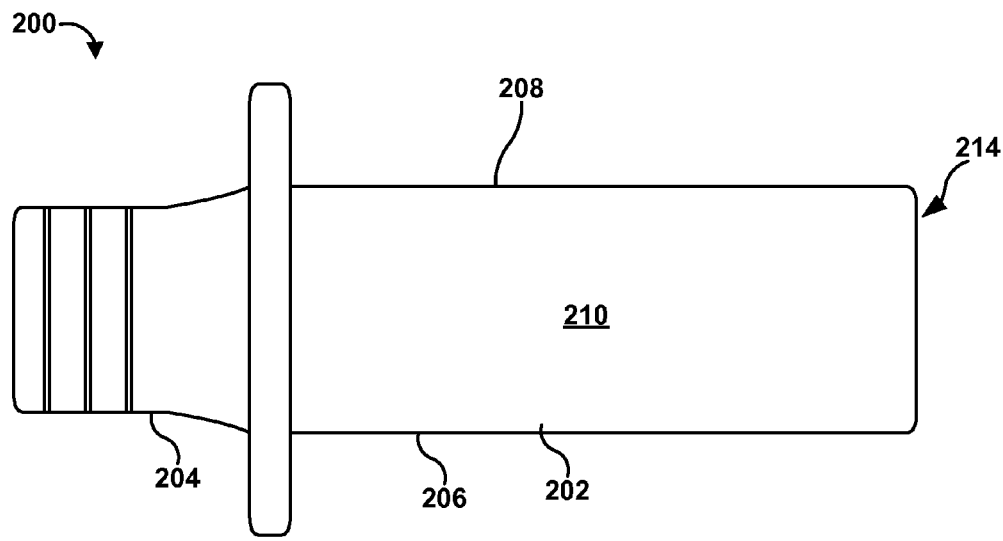
FIGS. 10A-C are conceptual diagrams of an example blade airfoil configured for use in a gas turbine engine.
Figure 10B:
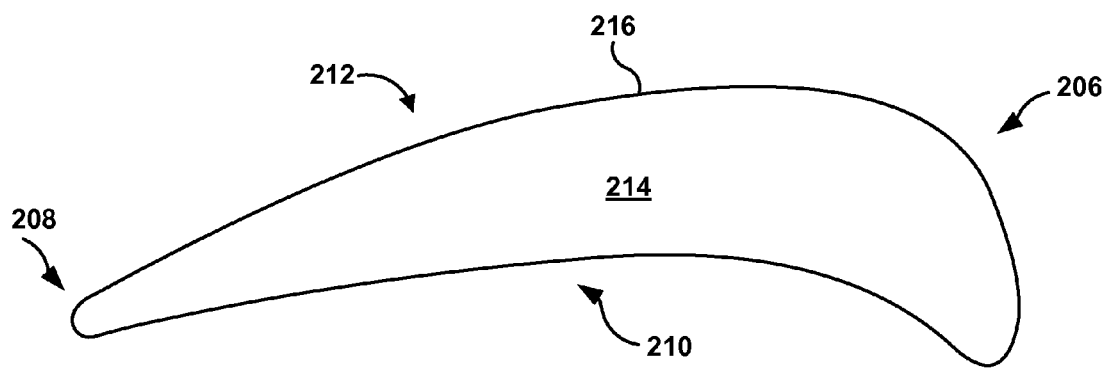
Figure 10C:
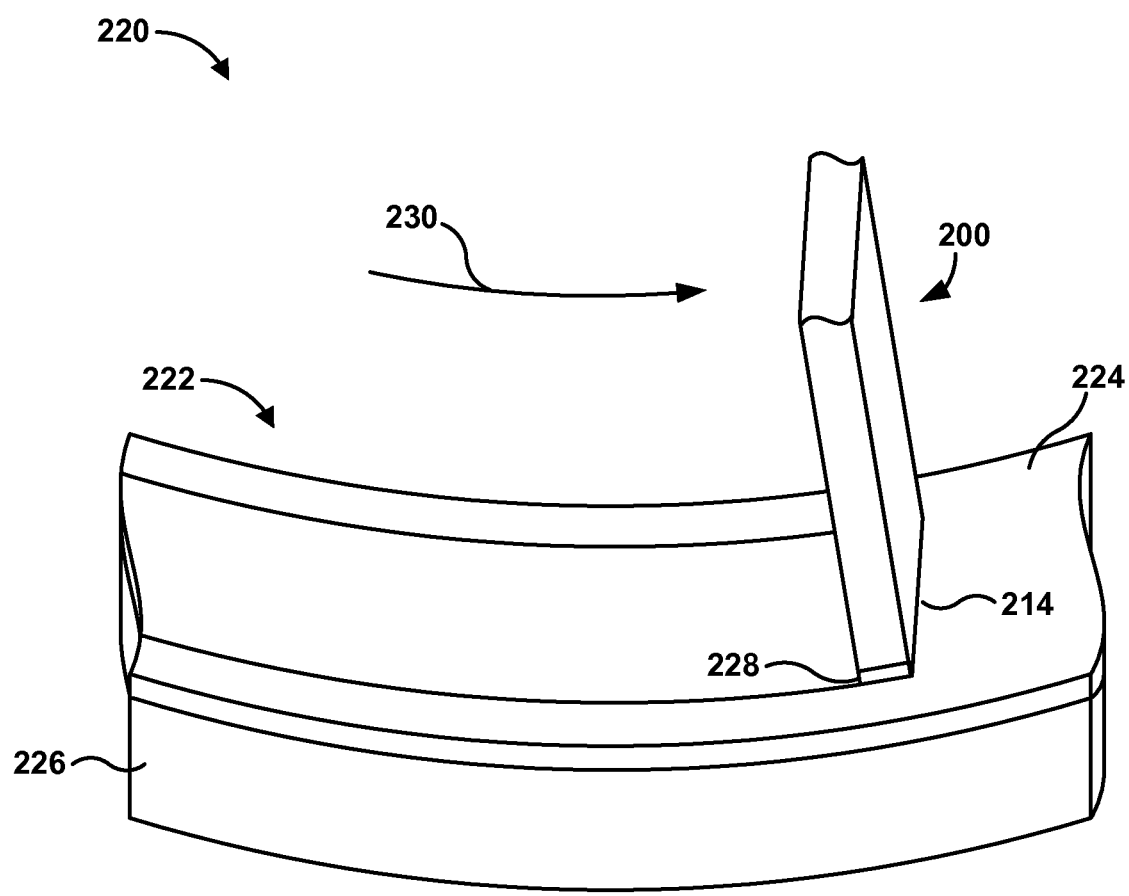

FIGS. 10A-C illustrate different views of an example blade 200 which may include features and arrays of features according to an example of the disclosure. Blade 200 generally includes airfoil 202 attached to stalk 204. Airfoil 202 includes a leading edge 206, a trailing edge 208, a pressure sidewall 210, and a suction sidewall 212. Pressure sidewall 210 is connected to suction sidewall 212 at leading edge 206 and trailing edge 208. Further, blade 200 defines blade tip 214, which is a surface substantially orthogonal to leading edge 206. Blade tip 214 is defined by an edge 216 which extends about the perimeter of the surface of blade tip 214, and separates the surface of blade tip 214 from the adjacent surface of airfoil 202. Leading edge 206, trailing edge 208, pressure sidewall 210, and suction side wall 212 generally extend from stalk 204 to edge 216.

In general, blade 200 is a component of a mechanical system including, e.g., a gas turbine engine. In different examples, blade 200 may be compressor blade that imparts kinetic energy into a fluid or a turbine blade that extracts kinetic energy from a moving fluid. FIG. 10C is a conceptual diagram of an example gas turbine engine 220 with blade 200. Gas turbine engine 220 includes blade track or blade shroud 222, which is defined into a surface 224 of a turbine substrate 226. Blade 200 is shown with a tip coating 228, which is described in greater detail below, deposited on blade tip 214. Although a single blade 200 is shown in gas turbine engine 220 for ease of description, in actual operation, gas turbine engine 220 may include a plurality of blades.

During operation of gas turbine engine 220, blade 200 rotates relative to blade track 222 in a direction indicated by arrow 230. In general, the power and efficiency of gas turbine engine 220 can be increased by reducing the gap blade track 222 and blade 200, e.g., to reduce or eliminate gas leakage around blade 200. Thus, gas turbine engine 220, in various examples, is configured to allow blade 200 to abrade into surface 224 of turbine substrate 226, thereby defining blade track 222 which creates a seal between blade track 222 and blade 200. The abrading action may create high thermal and shear stress forces at blade tip 214. In addition, occasional movement of blade tip 214 relative to turbine substrate 226 during the operation of gas turbine engine 222 may cause blade tip 214 to impinge on turbine substrate 226, creating high shear forces at blade tip 214.

To protect against the various forces acting on blade 200 and, in particular, blade tip 214, one or more protective layers may be provided on blade 200 and/or blade tip 214. For example, a tip coating 228, which is described in greater detail below, may be provided on blade tip 214 to improve different properties of an underlying blade surface including, e.g., wear, corrosion, hardness, and/or temperature resistance properties of an underlying blade surface. Additionally or alternatively, a protective coating may be applied to an entire airfoil 202, including blade tip 214, to improve different properties of an underlying blade surface. In some examples, airfoil 202 may receive a coating that reduces or substantially eliminates the effects of oxidation or corrosion on airfoil 202. Regardless of the specific number or specific type of coatings applied to blade 200, in some examples, blade 200 may benefit from the features and arrays of features described in the disclosure.

Figure 11A:
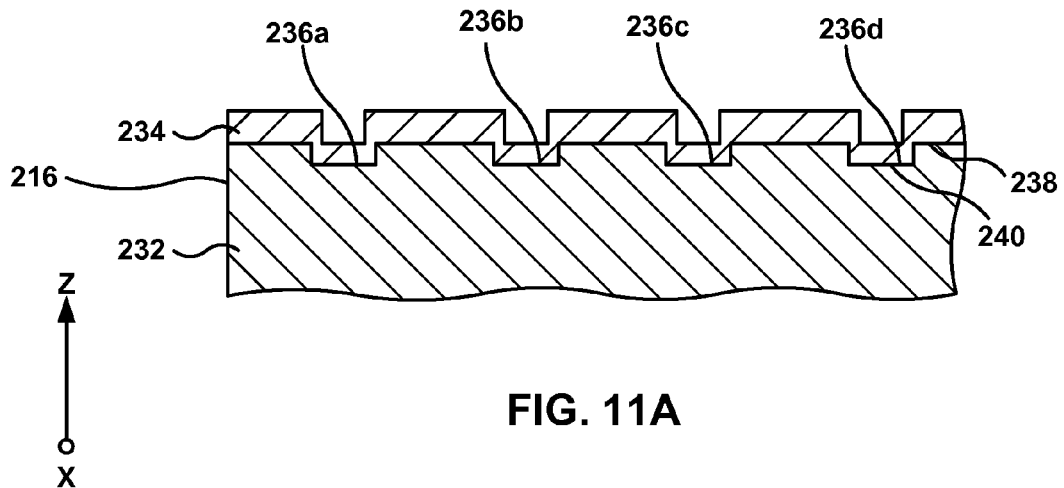
FIGS. 11A-C are cross-sectional diagrams of example airfoil surfaces for the example blade airfoil of FIGS. 10A-C.
Figure 11B:
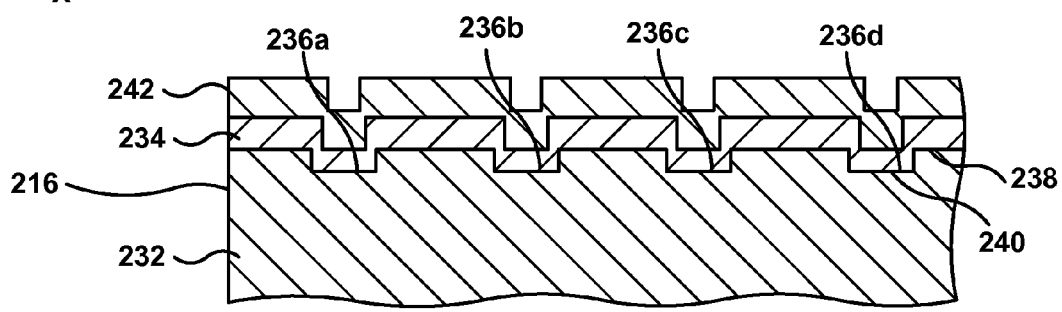
Figure 11C:
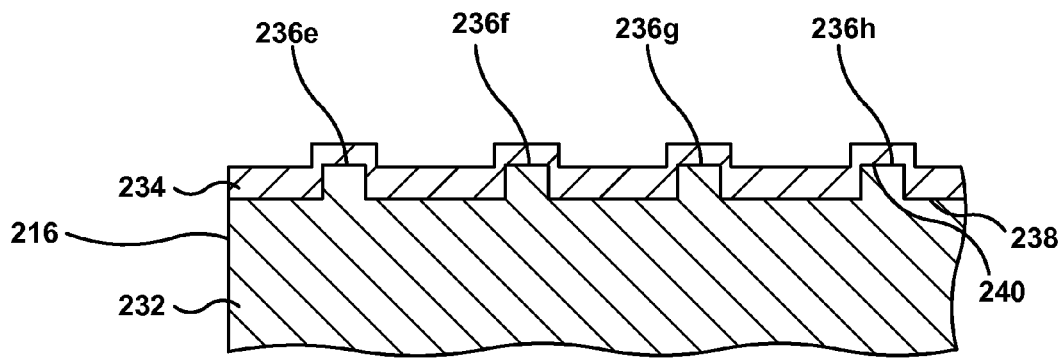

FIGS. 11A-C are cross-sectional diagrams of an example airfoil substrate 232 of blade 200. Airfoil substrate 232 in the example of FIGS. 11A and 11B includes four features 236a, 236b, 236c, and 236d (collectively "features 236") formed into surface 238 of airfoil substrate 232. Conversely, in the example of FIG. 11C, airfoil substrate 232 includes four features 236e, 236f, 236g, 236h (again collectively "features 236") extending out of surface 238 of airfoil substrate 232. A first coating 234 is formed on both surface 238 and features 236. In the addition, in the example of FIG. 11B, a second coating 242 is formed on first coating 234, surface 238, and features 236.

In various examples, surface 238 may be leading edge 206, trailing edge 208, pressure sidewall 210, suction side wall 212, blade tip 214, or another surface or combination of surfaces of blade 200 or another mechanical system component. However, for ease of description, surface 238 in the following examples is described as part of blade tip 214 defined by edge 216. It shall be understood though that the disclosure is not limited in this respect.

In general, airfoil substrate 232 defines a surface 238 that is constructed of a material suitable for a specific mechanical system operating environment. In some examples, airfoil substrate 232 may comprise a superalloy including, e.g., the various superalloys described with respect to substrate 26 in FIG. 1.

Surface 238 of airfoil substrate 232 may be exposed to environmental conditions that have a tendency to corrode, abrade, or otherwise degrade surface 238. Accordingly, first coating 234 may be formed over surface 238 and features 236 to provide protection from the harmful environmental conditions. In some examples, first coating 234 may be a blade tip coating that is applied to at least blade tip 214 of blade 200. Other parts of blade 200 may also be coated with a blade tip coating. In general, a blade tip coating is a coating configured to provide protection against harmful environmental conditions that are experience by blade tip 214. Blade tip 214 may experience high thermal and/or shear forces. Thus, a blade tip coating may be a coating that imparts wear resistance, corrosion resistance, thermal resistance, or other properties, or combinations of properties to blade tip 214. According to some examples when first coating 234 is a blade tip coating, first coating 234 may include an alloy, such as a MCrAlX alloy (where M is Fe, Co, Ni, or combinations thereof, and X is Y, Hf, Ce, La, Si, or combinations thereof). For example, first coating 234 may be a CoNiCrAlY alloy. In other examples, first coating 234 may be a ceramic-metallic material (which may also be referred to as a cermet material) that, e.g., exhibits temperature and wear resistance properties suitable for blade tip 214. Examples of a suitable cermet material include, but are not limited to, MCrAlY alloys (where M is Fe, Co, Ni, or combinations thereof) with one or more modifying elements. Examples of modifying elements include, but are not limited to, particle dispersions of alumina, chromia, chromium carbide, and combinations thereof. In other examples, first coating 234 may include Ni with an abrasive material, such as, e.g., cubic boron nitride. In yet further examples, first coating 234 may be a yttria-stabilized zirconia. A yttria-stabilized zirconia layer may be formed directly over surface 238 and features 236, or may instead be formed over one or more different coating layers, one of which is in turn formed directly over surface 238 and features 236. For example, a yttria-stabilized zirconia layer may be formed over an initial layer that includes a MCrAlX alloy. In this regard, a layer that includes a MCrAlX alloy may function as a bond coat to improve adherence between surface 238 and features 236 and the yttria-stabilized zirconia layer.

As described, surface 238 and features 236 may be exposed to a variety of different harmful environmental conditions including, e.g., elevated temperatures and pressures, reactive or corrosive species, and the like. Thus, surface 238 and features 236, in a variety of examples, may receive a plurality of different coatings (e.g., two, three, four, or more) that, for example, each protect against a different environmental condition or combinations of different environmental conditions. As an example, FIG. 11B illustrates first coating layer 234 and second coating 242 formed over surface 238 and features 236. Second coating 242 is generally selected to provide protection against one or more specific environmental conditions. In some examples, second coating 242 may function to reduce or eliminate oxidation of surface 238 and features 236. Thus, second coating 242 may be an oxidation-resistant coating including, but not limited to, an aluminide coating, such as a platinum-aluminide diffusion coating, or a platinum diffusion coating. It shall be understood that while in the example of FIG. 11B first coating 234 is shown adjacent to surface 238 and features 236, and second coating 242 is formed over first coating 234, in different examples, the position of first coating 234 and second coating 242 may be reversed and/or additional or different coating layers may be provided.

First coating 234 and second coating 242 may be formed on surface 238 and features 236 by, for example, a thermal spraying technique, such as air plasma spraying (APS), low pressure plasma spraying (LPPS), high velocity oxy-fuel spraying (HVOF), electroplating, or the like.

As described above, features 236 of substrate 232 may function to prevent detachment of first coating 234 and/or second coating 242 from surface 238. Features 236 may correspond substantially with features 36 described above with respect to FIG. 1. In general, features 236 disrupt the relative planarity of surface 238. For example, each of features 236 may form a discontinuity in surface 238. Features 236 may impede crack growth in first coating 234 and/or second coating 242 in a plane parallel to surface 238. That is, features 236 may result in an interference between surface 238 and first coating 234, or first coating 234 and second coating 242, that breaks surface 238 into an array of smaller segments. The transition between different segments of surface 238, e.g., at each of features 236, may limit crack growth and may contain crack growth to a single domain. Accordingly, even if a crack forms, crack growth and coating delamination is limited to a portion above a feature or between different features.

In addition, features 236 may increase the surface area of surface 238 to promote adhesion between dissimilar materials, e.g., surface 238 and first coating 234, or first coating 234 and second coating 238. Features 236 disrupt the relative planarity of surface 238 and may create structure that first coating 234 and/or second coating 242 can adhere to. First coating 234 and/or second coating 242 may adhere to out-of-plane surfaces created by features 236, thus resulting in an interlocked network of first coating 234 and/or second coating 242. Accordingly, features 236 may provide mechanical support that prevents or reduces crack growth or coating delamination of first coating 234 and/or second coating 242.

Figure 12A:
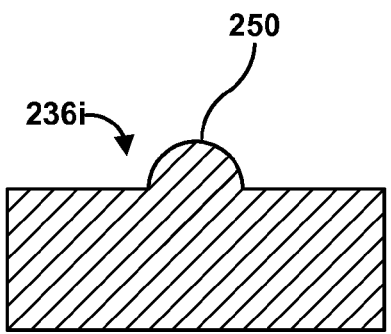
FIGS. 12A-F are cross-sectional diagrams illustrating exemplary cross-sectional shapes of features for the example airfoil surfaces of FIGS. 11A-C.
Figure 12B:
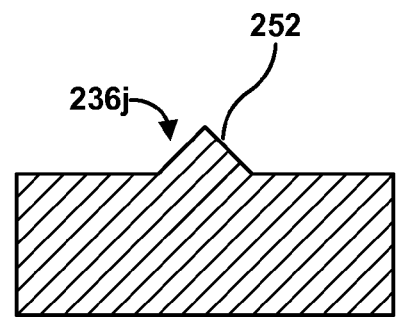
Figure 12C:
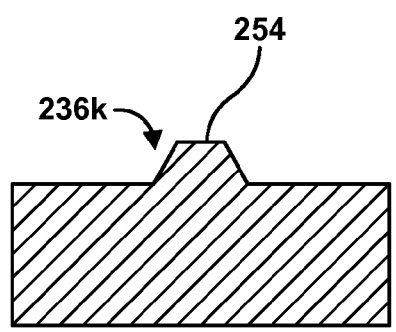
Figure 12D:
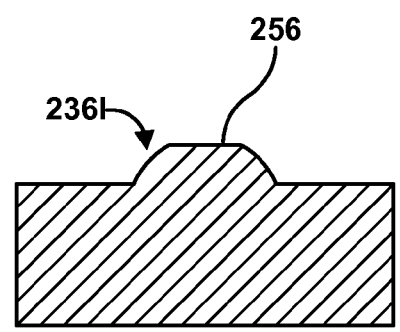

Features 236 may include, e.g., depressions in surface 238, as shown in FIGS. 11A and 11B, projections in surface 238, as shown in FIG. 11C, or a combination of depressions and projections. Features may include a generally rectangular cross-section 240, as show in FIGS. 11A-C, or may include a different cross-sectional profile. As examples, features 236 may include a cross-sectional profile or combination of cross-sectional profiles detailed above, e.g., with respect to FIGS. 2A-D. In additional examples, features 236 may include a cross-sectional profile illustrated in the examples of FIGS. 12A-D. For example, as shown in FIG. 12A, a feature 236$i$ may include a generally arcuate cross-section 250, such as a half-circle or another, lesser, portion of a circle. In other examples, as shown in FIGS. 12B-12E, a feature 236$j$ may include a generally triangular cross-section 252, a feature 236$k$ may include a generally trapezoidal cross-section 252, or a feature 236$l$ may include a truncated arcuate cross-section 256. Such cross-sectional profiles are merely examples; other cross-sectional profiles are also contemplated.

Figure 12E:
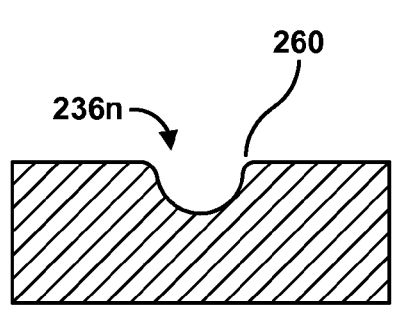
Figure 12F:
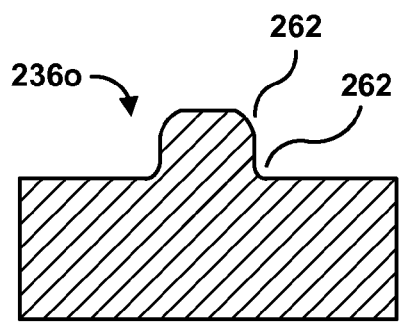

In addition, as described above with respect to FIG. 6, features 236 may include sharp edges, rounded edges, or a combination of sharp and rounded edges. As one example, FIG. 12E illustrates feature 236$n$, which is an example of feature 34$e$ (FIG. 2A) with rounded edges 260. As another example, FIG. 12F illustrates feature 236$o$, which is an example of features 236$e$-236$h$ (FIG. 11C) with rounded edges 262. Other features, as illustrated or described in the present disclosure may be configured with rounded edges. Rounded edges 260, 262 may reduce stress concentration that may develop at the edges of features 236. For example, rounded edges 260, 262 may preclude the formation of a stress-riser location that may otherwise be associated with features 236 that include sharp edges. A stress-riser location may concentrate out-of-plane stress, thereby promoting crack formation and crack growth. As another example, rounded edges 260, 262 may reduce or eliminate local stress created during the coating process. For instance, features 236 that include sharp edges may allow first coating 234 to bridge between different features of features 236 during the coating process. As a result, first coating 234 may cover features 236 and bridge between features 236 without covering surface 238 between features 236. Bridging may result in localized stress that promotes crack formation and growth. Rounded edges 260, 262 may reduce or eliminate bridging, and, hence, stress concentration. By reducing stress concentration, rounded edges 260, 262 may increase resistance to the formation of cracks at the edges of features 234.

As shown in FIGS. 11A-C, features 236 may be formed proximate to edge 216 of blade tip 214. In some examples, blade tip 214 may define a plurality of edges, and features 236 may be formed proximate two or more edges of blade tip 214. In any example, features 236 may be arranged such that features 236 do not intersect edge 216 on the X-Z plane illustrated on FIG. 11A. Such an arrangement may help prevent delamination of first coating 234 and/or second coating 242 from surface 238. While not wishing to be bound by any particular theory, during operation of gas turbine engine 220, various forces including, e.g., thermal and shear stress forces, may concentrate at edge 216 of blade tip 214. The concentrated forces may promote crack growth that can begin at edge 216 and extend radially inwards. By arranging features 236 such that features 236 do not intersect edge 216, however, crack formation may be eliminated or otherwise relegated to a small region of surface 238 adjacent edge 216. Accordingly, even if a crack forms, the crack is not allowed to grow to a point where a large section of coating layer may delaminate from surface 238. In addition, because blade tip 214 effects the aerodynamic performance, and hence efficiency, of gas turbine engine 220, arranging features 236 such that features 236 do not intersect edge 216 may provide better aerodynamic performance than a comparable blade tip 214 with features 236 intersecting edge 216. This may improve the power and efficiency of gas turbine engine 220, which is advantageous for a variety of reasons.

Figure 13A:
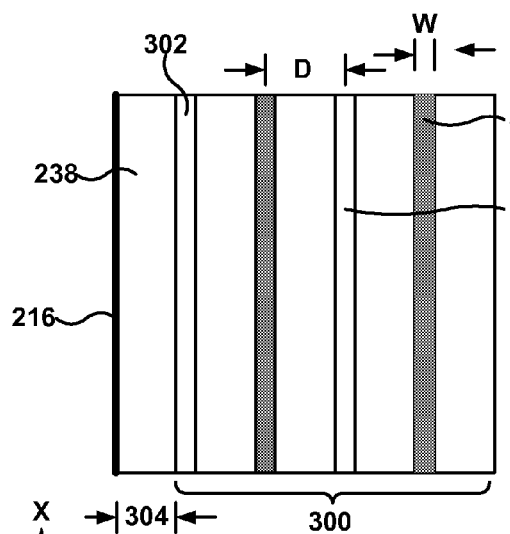
FIGS. 13A-13G are conceptual diagrams depicting example blade tip surfaces on which example arrays of features are formed.

Features 236 may be formed in an array comprising a plurality of features 236. FIGS. 13A-13F illustrate a number of exemplary features 236 and arrays of features 236 from a plan view. For example, FIG. 13A shows an array of features 300 including a plurality of linear features 302. In various examples, linear features 302 are grooves 302$a$ that create depressions into surface 238 or projections 302$b$ that extend out of surface 238 (collectively referred to as "linear features 302"). Linear features 302 are oriented substantially parallel to each other and are formed proximate to edge 216. Linear features 302 do not, however, intersect edge 216. Such an arrangement may segregate surface 238 into a plurality of domains, each domain being located between adjacent linear features. As described above, this may reduce or eliminate delamination of a coating formed on surface 238 while maintaining suitable aerodynamic performance for blade 200.

In general, linear features 302 do not intersect edge 216 of blade tip 214. In some examples, linear features 302 may be immediately adjacent to edge 216 without intersecting edge 216. In other examples, linear features 302 may arranged a minimum distance 304 away from edge 216. For example, linear features may be arranged between at least approximately 10 mils (i.e., 0.010 inches) and approximately 200 mils away from edge 216 such as, e.g., between at least approximately 50 mils and approximately 125 mils away from edge 216.

In some examples, linear features 302 may all be approximately the same width W, as shown in FIG. 13A. In other examples, one or more linear features 302 may be a different width W than other linear features 302. In some examples, a width W of each of linear features 302 may be between approximately 0.005 inches and approximately 0.125 inches, such as, e.g., between approximately 0.004 inches and approximately 0.008 inches.

Adjacent linear features 302 may be spaced approximately evenly apart, or may be spaced different distances apart. The distance D between adjacent linear features 302 may be referred to as pitch, and in some examples, may vary between approximately 0.1 inches and approximately 0.3 inches, such as, e.g., between approximately 0.125 inches and approximately 0.250 inches. In some examples, the pitch may increase or decrease monotonically. In other examples, the pitch may increase and then decrease or may decrease and then increase. In yet other examples, as illustrated in FIG. 13A, the pitch may be approximately constant.

Linear features 302 may have a variety of cross-sectional shapes, including, for example, an arcuate, truncated arcuate, rectangular, trapezoidal, or triangular cross-section, as illustrated in FIGS. 1B, 2A-2D, 11A-C, and 12A-D. Each of linear features 302 may have the same cross-sectional profile, or at least one of linear features 302 may have a different cross-sectional profile than another one of linear features 302. The depth of each of linear features 302a or the height of each linear features 302b may be between approximately 0.004 inches and approximately 0.020 inches. That is, each of linear features 302a may create a groove between approximately 0.004 inches and approximately 0.020 inches below the X-Y plane defined by surface 238, or each of linear features 302b may extend between approximately 0.004 inches and approximately 0.020 inches above the X-Y plane defined by surface 238. In some examples, the depth of each of linear features 302a or the height of each of linear features 302b may be between approximately 0.004 inches and approximately 0.008 inches. Similar to the width W, the depth of each of linear features 302a or the height of each of linear features 302b may be approximately the same, or the depth of at least one of linear features 302a or the height of at least one of linear features 302b may be different than at least one of other of linear features 302. The depth of each of linear features 302a or the height of each of linear features 302b may increase or decrease monotonically, may increase and then decrease, or decrease and then increase.

Figure 13B:
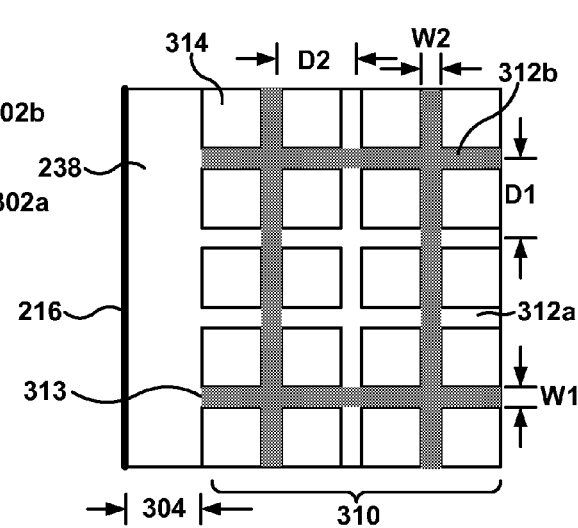

FIG. 13B illustrates an array of features 310 that includes a grid 313 formed by a first plurality of linear features formed substantially parallel to each other and a second plurality of linear features formed substantially parallel to each other and substantially perpendicular to the first plurality of linear features. In various examples, each linear feature is a groove 312a that creates a depression into surface 238 or projection 312b that extends out of surface 238 (collectively "linear features 312" or "grid 313"). In one example, linear features 312 are all grooves resulting in plateaus 314. In another example, linear features are all projections resulting in depressions 314. Alternatively, grid 313 includes both grooves and projections. For example, the first plurality of linear features 312 may be grooves 312a and the second plurality of linear features 312 may be projections 312b. In another example, the linear features may alternate between grooves and projections including, e.g., one groove followed by one projection, or a plurality of grooves followed by a plurality of projections. Further combinations of grooves and projections are contemplated. Independent of the specific selection of grooves and projections, grid 313 segregates surface 238 into a plurality of domains and impedes cracks from growing from one domain to an adjacent domain.

Array of features 310 is formed proximate to edge 216 without intersecting edge 216. In various examples, array of features 310 may be immediately adjacent edge 216 without intersecting edge 216. In other examples, array of features 310 may arranged a minimum distance away from edge 216 including, e.g., minimum distance 304 described with respect to FIG. 13A.

In some examples, each of linear features 312 oriented substantially horizontally in FIG. 13B may have a first width W1, and each of the linear features oriented substantially vertically in FIG. 13B may have a second width W2. In some examples, first width W1 may be the same as second width W2, while in other examples first width W1 may be different than second width W2. In addition, in some examples the width of at least one vertically oriented linear feature in grid 313 may be different than the width of another vertically oriented linear feature in grid 313. Similarly, the width of at least one horizontally oriented linear feature in grid 313 may be different than the width of another horizontally oriented linear feature in grid 313. In some examples, the width of horizontally or vertically oriented linear feature in grid 313 may increase or decrease monotonically, while in other examples, the width of horizontally or vertically oriented linear feature in grid 313 may increase and then decrease or decrease and then increase. The width (W1 or W2) of each of the linear feature in grid 313 may be between approximately 0.005 inches and approximately 0.125 inches, such as, e.g., between approximately 0.004 inches and approximately 0.008 inches.

Adjacent parallel linear features in grid 313 may be spaced approximately evenly apart, or may be spaced different distances apart. In some examples, the distance D1 or D2 (also known as pitch 1 or pitch 2) between adjacent linear features may vary between approximately 0.1 inches and approximately 0.3 inches, such as, e.g., between approximately 0.125 inches and approximately 0.250 inches. In some examples, the pitch may increase or decrease monotonically. In other examples, the pitch may increase and then decrease or may decrease and then increase. In yet other examples, as illustrated in FIG. 13B, the pitch may be approximately constant. In addition, in some examples the distance D1 between adjacent linear features in a first direction may be different than the distance D2 between adjacent linear features in a second direction. In some examples, the pitch in one direction may increase or decrease within grid 313, while the pitch in a second direction may be approximately constant.

Each of the linear features in grid 313 may have a variety of cross-sectional shapes, including, for example, an arcuate, truncated arcuate, rectangular, trapezoidal, or triangular cross-section, as illustrated in FIGS. 1B, 2A-2D, 11A-C, and 12A-D. Each of the linear features in grid 313 may have the same cross-sectional profile, or at least one of the linear features in grid 313 may have a different cross-sectional profile than another one of the linear features in grid 58. The depth of each of the linear features 312a or the height of each of linear features 312b may be between approximately 0.002 inches and approximately 0.020 inches. In some examples, the depth of each of the linear features 312a or the height of each of linear features 312b may be between approximately 0.004 inches and approximately 0.008 inches. Similar to the width W, the depth of each of the linear features 312a or the height of each of linear features 312b in grid 313 may be approximately the same or the depth or the height of at least one of linear features 312 may be different than at least one other of the linear features. The depth of each of linear features 312a or the height of each of linear features 312b may increase or decrease monotonically, or may increase and then decrease or decrease and then increase. In some examples, the depth of each of linear features 312a or the height of each of linear features 312b oriented in a first direction, e.g., vertically in FIG. 13B, may be different than the depth or height of the linear features oriented in a second direction, e.g., horizontally in FIG. 13B. In addition, the depth of each of linear features 312a or the height of each of linear features 312b oriented in one direction may change within grid 313, while the depth or height of linear features oriented in a second direction within grid 313 may be approximately constant.

Figure 13C:
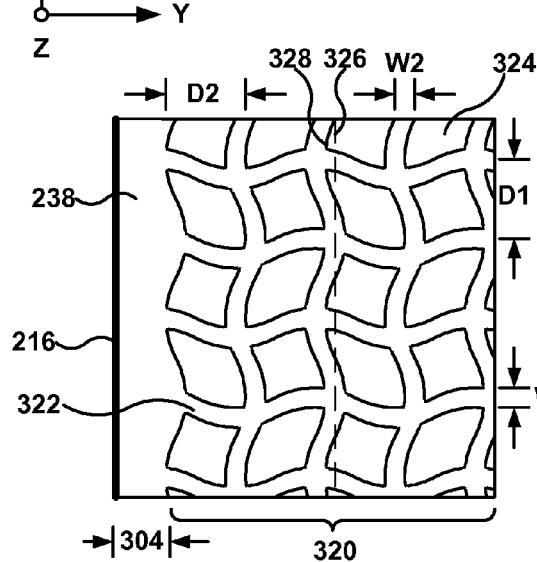

In other examples, as illustrated in FIG. 13C, an array of features 320 may include a grid of sinusoidal features 322. In various examples, each sinusoidal feature is defined by a groove that creates a depression into surface 238, a projection that extends out of surface 238, or a combination of grooves and projections. In one example, all sinusoidal features are defined by grooves resulting in plateaus 324 (e.g., as illustrated in FIG. 13C). In another example, all sinusoidal features are defined by projections resulting in depressions 324. Alternatively, some sinusoidal features may be defined by grooves while other sinusoidal features are defined by projections. For example, one row or column of sinusoidal features may be define by grooves while another row or column, e.g., an adjacent row or column, may be defined by projections. In different examples, grid 322 may alternate between grooves and projections including, e.g., one groove followed by one projection, or a plurality of grooves followed by a plurality of projections. Further combinations of grooves and projections are contemplated. In any configuration, grid 322 segregates surface 238 into a plurality of domains and impedes cracks from growing from one domain to an adjacent domain.

As described above, array of features 320 is formed proximate to edge 216 without intersecting edge 216. In various examples, array of features 320 may be immediately adjacent to edge 216 without intersecting edge 216. In other examples, array of features 320 may be arranged a minimum distance away from edge 216 including, e.g., minimum distance 304 described with respect to FIG. 13A.

As further described above, each of the grooves or projections oriented in a first direction may have a first width W1, and each of the grooves or projections oriented in a second direction may have a second width W2. In some examples, first width W1 may be the same as second width W2, while in other examples first width W1 may be different than second width W2. In addition, in some examples the width of at least one groove or projection oriented in a first direction in grid 322 may be different than the width of another groove or projection oriented in a second direction in grid 322. In some examples, the width of grooves or projections oriented in a single direction in grid 322 may increase or decrease monotonically, while in other examples, the width of grooves or projections oriented in a single direction in grid 322 may increase and then decrease or decrease and then increase. The width (W1 or W2) of each of the grooves or projections in grid 322 may be between approximately 0.005 inches and approximately 0.125 inches, such as, e.g., between approximately 0.004 inches and approximately 0.008 inches.

Adjacent parallel grooves or projections in grid 322 may be spaced approximately evenly apart, or may be spaced different distances apart, similar to the grooves in grid 310 illustrated in FIG. 13B. In some examples, the distance D1 or D2 (also referred to as pitch 1 or pitch 2) between adjacent grooves or projections may vary between approximately 0.1 inches and approximately 0.3 inches, such as, e.g., between approximately 0.125 inches and approximately 0.250 inches. The pitch may increase or decrease monotonically, may increase and then decrease, may decrease and then increase, or may be approximately constant. In addition, the distance D1 between adjacent grooves or projections oriented in a first direction may be different than the distance D2 between adjacent grooves or projections oriented in a second direction. In some examples, the pitch in one direction may increase or decrease within grid 322, while the pitch in a second direction may be approximately constant.

The amplitude, e.g., the distance from line 326 to a peak of groove or projection 328, of the sinusoidal grooves or projections in grid 322 may vary, and in some examples, may be between approximately 0.2 inches and approximately 0.3 inches. In other examples, the amplitude may be less than 0.2 inches or greater than approximately 0.3 inches.

Each of the grooves or projections in grid 322 may have one of a variety of cross-sectional shapes, including, for example, an arcuate, truncated arcuate, rectangular, trapezoidal, or triangular cross-section, as illustrated in FIGS. 1B, 2A-2D, 11A-C, and 12A-D. The cross-sectional profiles of each of the grooves or projections may be the same, or may be different. The depth of each of the grooves or the height of each of the projections may be between approximately 0.002 inches and approximately 0.020 inches. In some examples, the depth of each of the grooves or the height of each of the projections may be between approximately 0.004 inches and approximately 0.008 inches. In addition, the depth of at least one of the grooves, or the height of at least one of the projections, in grid 322 may be approximately the same or may be different than at least one of another groove or projection in grid 322. The depth of the grooves or the height of the projections may increase or decrease monotonically, may increase and then decrease, or decrease and then increase. In some examples, the depth of the grooves or the height of the projections oriented in a first direction may be different than the depth of the grooves or the height of the projections oriented in a second direction. In addition, the depth of the grooves or the height of the projections oriented in one direction may change within grid 322, while the depth of grooves or the height of the projections oriented in a second direction within grid 322 may be approximately constant.

Figure 13D:
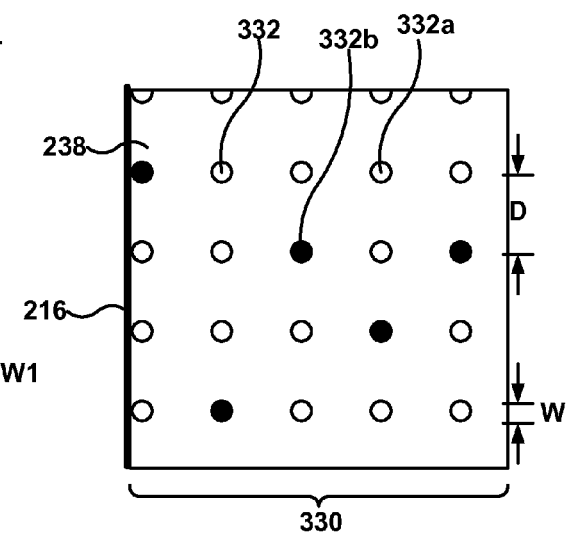
Figures 13E, 13F:
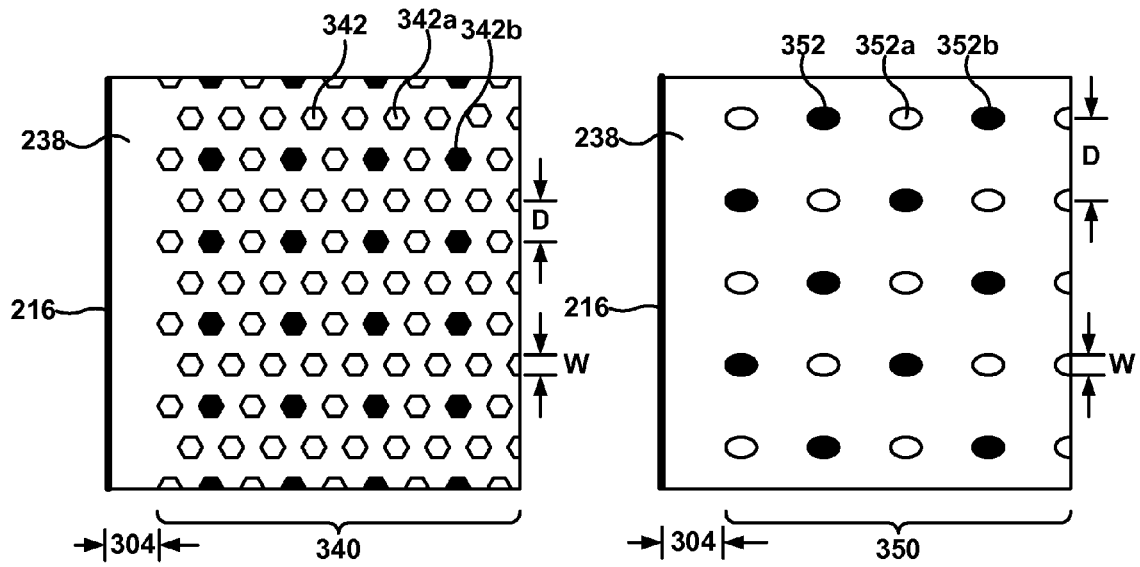

In some examples, a surface may include an array of discrete features instead of an array of substantially continuous features. For example, FIG. 13D illustrates an array of features 330 that includes a plurality of circular features 332. Similarly, FIG. 13E illustrates an array of features 340 that includes a plurality of hexagonal features 342, and FIG. 13F illustrates an array of features 350 that includes a plurality of elliptical features 352. In various examples, each circular, hexagonal, and elliptical feature 332, 342, 352 (collectively "features 332") may be a depression 332a, 342a, 352a into surface 238, a projection 332b, 342b, 352b that extends out of surface 238, or a combination of depressions and projections. In one example, features 332 are all depressions. In another example, features 332 are all projections. Alternatively, some of features 332 may be depressions while other of features 332 may be projections. For example, features 332 may alternative between depressions and projections including, e.g., one of features 332 defined by a depression followed by another one of features 332 defined by a projection, or a plurality features 332 defined by depressions followed by a plurality of features 332 defined by projections. Further combinations of depressions and projections are contemplated. In any configuration, array of features 330, 340, 350 may be formed proximate to edge 216 without intersecting edge 216. In various examples, array of features 330, 340, 350 may be immediately adjacent to edge 216 without intersecting edge 216. In other examples, array of features 320 may be arranged a minimum distance away from edge 216 including, e.g., minimum distance 304 described with respect to FIG. 13A. In this manner, array of features 330, 340, 350 segregates surface 238 into a plurality of domains, thereby preventing concentrated forces at edge 216 from initiating crack growth and impeding cracks from growing from one domain to an adjacent domain.

As shown in FIGS. 13D, 13E and 13F, the plurality of features 332 form different patterns proximate to edge 216 without intersecting edge 216. The illustrated patterns and shapes of features 332 are merely examples, and other patterns and shapes of features 332 are contemplated by the disclosure. In addition, an array of features may include the shapes of features 332, different shapes, or combination of shapes.

As described above, each of features 332 may have a diameter or width W. In some examples, the diameter or width W of features 332 may increase or decrease monotonically, while in other examples, the diameter or width W of features 332 may increase and then decrease or decrease and then increase. The diameter or width W of each of features 332 may be between approximately 0.005 inches and approximately 0.175 inches, such as, e.g., between approximately 0.02 inches and approximately 0.125 inches.

Features 332 may be spaced approximately evenly apart, or may be spaced different distances apart, similar to the linear features in grid 322 illustrated in FIG. 13B. The distance D (also referred to as pitch) between adjacent features 332 may vary in some examples and may be between approximately 0.1 inches and approximately 0.3 inches, such as, e.g., between approximately 0.125 inches and approximately 0.250 inches. The pitch may increase or decrease monotonically, may increase and then decrease, may decrease and then increase, or may be approximately constant. In addition, the distance D between adjacent features 332 in a first direction may be different than the distance D between adjacent features 332 in a second direction. In some examples, the pitch in one direction may increase or decrease, while the pitch in a second direction may be approximately constant. In other examples, the pitch in two substantially perpendicular directions may each change, e.g., increase in both directions, decrease in both directions, or increase in a first direction and decrease in a second direction.

Each of features 332 may have one of a variety of cross-sectional shapes, including, for example, an arcuate, truncated arcuate, rectangular, trapezoidal, or triangular cross-section, as illustrated in FIGS. 1B, 2A-2D, 11A-C, and 12A-D. The cross-sectional profiles of each of features 332 may be the same or may be different within an array of features 330, 340, 350. The depth or height of each of features 332 may be between approximately 0.002 inches and approximately 0.020 inches. In some examples, the depth or height of each of features 332 may be between approximately 0.004 inches and approximately 0.008 inches. In addition, the depth or height of features 332 within an array of features 330, 340, 350 may be approximately the same, or the depth or height of at least one of features 332 may be different than at least one other of the features 332. The depth or height of features 332 may increase or decrease monotonically, may increase and then decrease, or decrease and then increase. In addition, the depth or height of features 332 may change along one direction within an array of features 330, 340, 350, while the depth or height of features 332 may or may not change along a second, substantially perpendicular direction within the array of features 330, 340, 350.

Figure 13G:
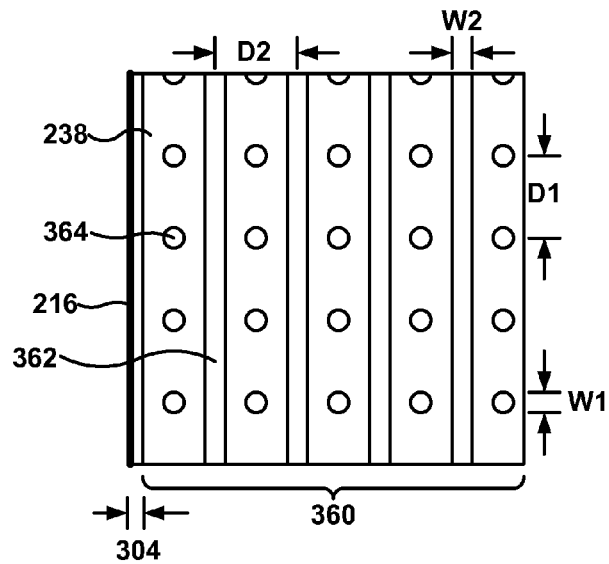

Although substantially continuous features (e.g., linear features 302) and discrete features (e.g., circular features 332) have been described separately, in some examples, continuous and discrete features may be utilized together. For example, FIG. 13G shows an array of features 360 including a plurality of linear features 362 and a plurality of circular features 364. In various examples, each of linear features 362 and circular features 364 may be a depression (e.g., groove) into surface 238, a projection that extends out of surface 238, or a combination of depressions and projections, as described with respect to FIGS. 13A and 13D. For example, linear features 362 and circular features 364 may all be projections, all be depressions (e.g., as illustrated in FIG. 13G for ease of description), or may be a combination of projections and depressions. In some examples, linear features 362 may be depressions and circular features 364 projections, or linear features 362 may be projections and circular features 364 depressions. In other examples, some linear features 362 and circular features 364 are projections while other linear features 362 and circular features 364 are depressions, e.g., alternating rows or columns of circular projections and depressions coupled with alternating rows or columns of linear projections or depressions. In any event, array of features 360 may be formed immediately adjacent edge 216 without intersecting edge 216. In other examples, array of features 360 may arranged a minimum distance away from edge 216 including, e.g., minimum distance 304 described with respect to FIG. 13A. In this manner, array of features 360 segregates surface 238 into a plurality of domains, thereby preventing concentrated forces at edge 216 from initiating crack growth and impeding cracks from growing from one domain to an adjacent domain.

In the example of FIG. 13G, linear features 362 are located between columns of circular features 364, and circular features 364 are arranged approximately equidistant from one another. In some examples, linear features 362 may be approximately the same width W2, as width W shown in FIG. 13A. In other examples, one or more linear features 362 may be a different width W2 than other linear features. In some examples, a width W2 of each of linear features 362 may be between approximately 0.005 inches and approximately 0.125 inches, such as, e.g., between approximately 0.004 inches and approximately 0.008 inches.

Adjacent linear features 362 may be spaced approximately evenly apart, or may be spaced different distances apart. The distance D2 between adjacent linear features 362 may be referred to as pitch, and in some examples, may vary between approximately 0.1 inches and approximately 0.3 inches, such as, e.g., between approximately 0.125 inches and approximately 0.250 inches. In other examples, the pitch may increase and then decrease or may decrease and then increase. In yet other examples, as illustrated in FIG. 13G, the pitch may be approximately constant.

Linear features 362 may have a variety of cross-sectional shapes, including, for example, an arcuate, truncated arcuate, rectangular, trapezoidal, or triangular cross-section, as illustrated in FIGS. 1B, 2A-2D, 11A-C, and 12A-D. Each of linear features 362 may have the same cross-sectional profile, or at least one of linear features 362 may have a different cross-sectional profile than another one of linear features 362. The depth or height of each of linear features 362 may be between approximately 0.002 inches and approximately 0.020 inches. In some examples, the depth or height of each of linear features 362 may be between approximately 0.004 inches and approximately 0.008 inches. Similar to the width W2, the depth or height of each of linear features 362 may be approximately the same as, or different than, the depth or height of at least one of linear features 362. The depth or height of linear features 362 may increase or decrease monotonically, may increase and then decrease, or decrease and then increase.

The plurality of circular features 364 may be formed proximate to edge 216. Circular features 364 may also be substantially aligned to form a pattern of rows of depressions or projections interspersed between linear features 362.

Each of circular features 364 may have a diameter or width W1, which may be the same as or different than width W2 of linear features 362. In some examples, the diameter or width W1 of circular features 364 may increase or decrease monotonically, while in other examples, the diameter or width W1 of circular features 364 may increase and then decrease or decrease and then increase. The diameter or width W1 of each of circular features 364 may be between approximately 0.005 inches and approximately 0.175 inches, such as, e.g., between approximately 0.02 inches and approximately 0.125 inches.

Circular features 364 may be spaced approximately evenly apart, or may be spaced different distances apart, similar to the linear features in grid 313 illustrated in FIG. 13B. The distance D1 (also referred to as pitch) between adjacent circular features 364 may vary in some examples between approximately 0.1 inches and approximately 0.3 inches, such as, e.g., between approximately 0.125 inches and approximately 0.250 inches. The pitch may increase or decrease monotonically, may increase and then decrease, may decrease and then increase, or may be approximately constant. In addition, the distance D1 between adjacent circular features 364 in a first direction may be different than the distance D1 between adjacent circular features 364 in a second direction. In some examples, the pitch in one direction may increase or decrease, while the pitch in a second direction may be approximately constant. In other examples, the pitch in two substantially perpendicular directions may each change, e.g., increase in both directions, decrease in both directions, or increase in a first direction and decrease in a second direction.

Each of circular features 364 may have one of a variety of cross-sectional shapes, including, for example, an arcuate, truncated arcuate, rectangular, trapezoidal, or triangular cross-section, as illustrated in FIGS. 1B, 2A-2D, 11A-C, and 12A-D. The cross-sectional profiles of each of circular features 364 may be the same as or may be different than the cross-sectional profiles of linear features 362, and may be the same or may be different within array of features 360. The depth or height of each of circular features 364 may be between approximately 0.004 inches and approximately 0.020 inches. In some examples, the depth or height of each of circular features 364 may be between approximately 0.004 inches and approximately 0.008 inches. In addition, the depth or height of circular features 364 within array of features 360 may be approximately the same or the depth or height of at least one of circular features 364 may be different than at least one other of circular features 364. The depth or height of circular features 364 may increase or decrease monotonically, may increase and then decrease, or decrease and then increase. In addition, the depth or height of circular features 364 may change along one direction within array of features 360, while the depth or height of circular features 364 may or may not change along a second, substantially perpendicular direction within array of features 360.

Although features in the preceding examples of FIGS. 11A-11C and 13A-13G are generally illustrated as being arranged parallel to edge 216 of blade tip 214, it shall be understood that the disclosure is not limited in this respect, and features and arrays of features according this disclosure may assume different orientations with respect to edge 216 of blade tip 214. For example, as is apparent from FIG. 10B, edge 216 of blade tip 214 need not define a continuous straight edge but may instead define a curved or polygonal shape. Accordingly, features and arrays of features of the disclosure may take different orientations with respect to edge 216, and an orientation may be the same across a blade tip 214 or may be different at different positions on blade tip 214.

For example, as described above, features and arrays of features arranged proximate to edge 216 without intersecting edge 216 may reduce or eliminate delamination of a coating formed on blade tip 214. Accordingly, in some examples, features and arrays of features may oriented with respect to a perimeter or a portion of a perimeter of blade tip 214 established by edge 216. In one example, features and arrays of features may be oriented substantially parallel to a perimeter or a portion of a perimeter established by edge 216. In another example, features and arrays of features may be oriented substantially perpendicular to a perimeter or a portion of a perimeter established by edge 216. In additional examples, features and arrays of features may be acutely angled, tangentially arrayed, or otherwise oriented with respect to a perimeter or a portion of a perimeter established by edge 216, as will be appreciated by those of skill in the art.

Figure 14A:
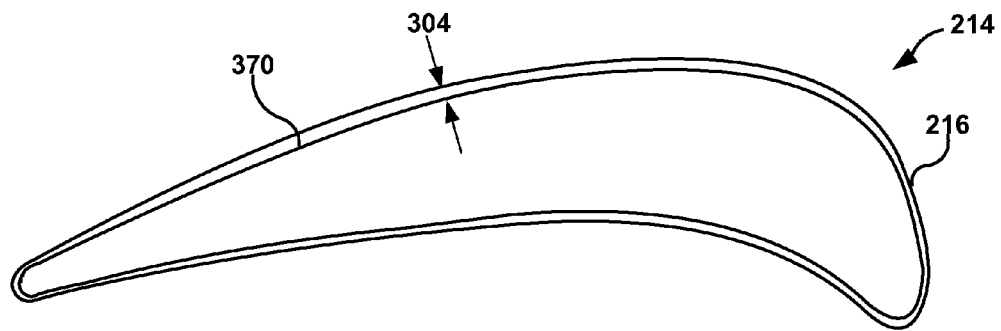
FIGS. 14A-14C are conceptual diagrams illustrating example blade tips with example arrays of features.
Figure 14B:
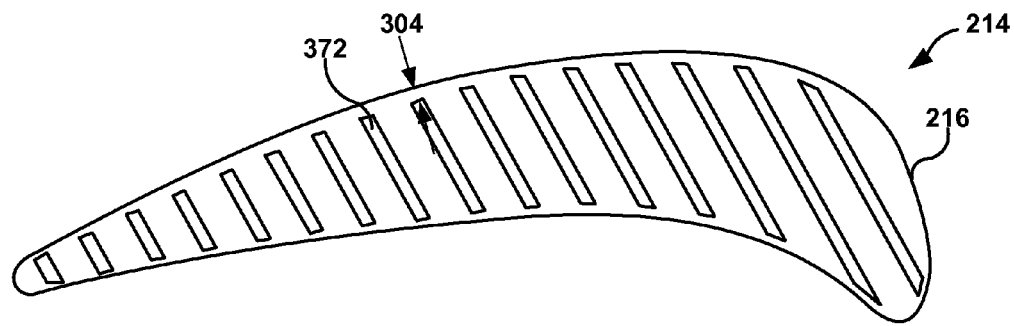
Figure 14C:
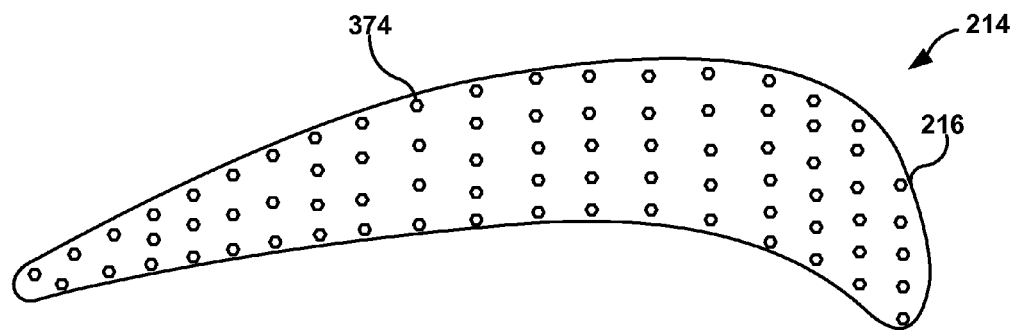

FIGS. 14A-14C are conceptual diagrams illustrating example blade tips 214 with example orientations that may be assumed by the features and arrays of features of this disclosure. FIG. 14A illustrates blade tip 214 and feature 370, which is oriented substantially parallel to the perimeter of blade tip 214 established by edge 216. Feature 370 may be a groove that defines a depression in the surface of blade tip 214 or a projection that extends out of the surface of blade tip 214. Feature 370 may be any feature or array of features according to this disclosure, although in the example of FIG. 14A, feature 370 is illustrated as a continuous linear feature. In some examples, blade tip 214 may include a plurality of features instead of a single feature 370 oriented substantially parallel to a perimeter of blade tip 214 established by edge 214. For example, blade tip 214 may include a plurality of concentrically oriented features, each of which is oriented substantially parallel to a perimeter of blade tip 214 established by edge 214. Each of the features 370 may be arranged a minimum distance away from edge 216 including, e.g., minimum distance 304 described with respect to FIG. 13A. By orienting feature 370 relative to a perimeter of blade tip 214 established by edge 214, feature 370 may reduce or eliminate crack growth caused by concentrated forces at edge 216.

FIG. 14B illustrates an alternative configuration of blade tip 214 with discrete features 372. Discrete features 372 are arranged in an array, with each feature of discrete features 372 acutely angled relative to a perimeter of blade tip 214 established by edge 214. As with feature 370 in FIG. 14A, each feature of features 372 in FIG. 14B may be a groove that defines a depression in the surface of blade tip 214 or a projection that extends out of the surface of blade tip 214. Each feature of features 372 is illustrated as a linear feature, but the illustrated patterns and shapes of features 372 are merely examples, and other patterns, shapes, and combinations of features 372 may be used as outlined in this disclosure. Each feature of features 372 may be arranged a minimum distance 304 away from edge 216. In this manner, features 372 may reduce or eliminate crack growth caused by concentrated forces at edge 216 while also segregating the surface of blade tip 214 disposed away from edge 216 into a plurality of domains. A plurality of domains disposed away from edge 216 may reduce or eliminate delamination between a coating layer and blade tip 214 near the center of blade tip 214 and in areas disposed away from edge 216.

FIG. 14C illustrates a different configuration of blade tip 214 with discrete features 374. Discrete features 374 are arranged in an array that evenly spaces discrete features 374 across blade tip 214. At least some of features 374 are located proximate edge 216 without intersecting 216. As with FIGS. 14A, 14B, each feature of discrete features 374 may be a groove that defines a depression in the surface of blade tip 214 or a projection that extends out of the surface of blade tip 214. Each feature of features 374 is illustrated as a hexagonal feature, although other patterns, shapes, and combinations of features 374 may be used in accordance with this disclosure. Each feature of features 374 may be arranged a minimum distance 304 away from edge 216.

Figure 15:
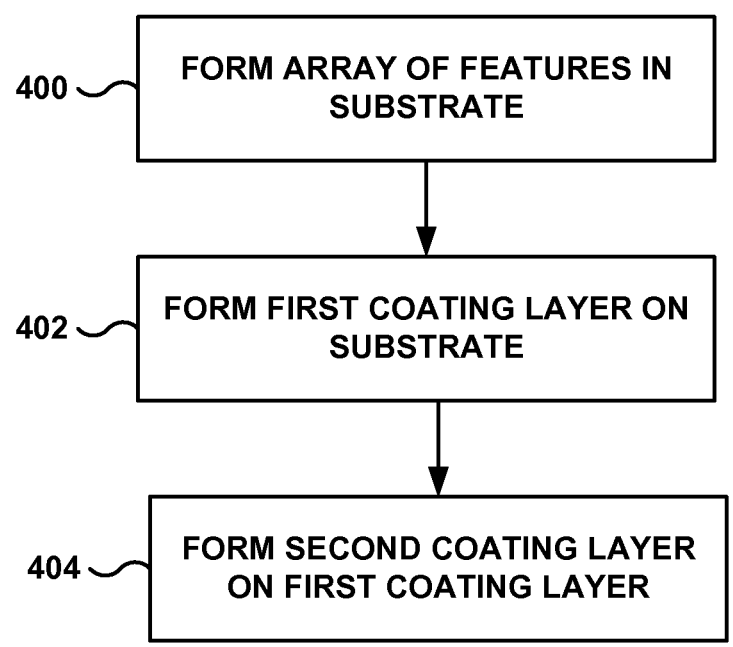
FIG. 15 is a flow diagram of an example technique of forming an article including a substrate, an array of features formed in the substrate, and one or more coating layers formed on the substrate and the array of features.

FIG. 15 is a flow diagram of an example technique of forming an article that includes a substrate that defines an edge, a plurality of features formed in the substrate, and a coating layer formed on the substrate and the plurality of features. For ease of description, the technique of FIG. 15 will be described with reference to blade tip 214 shown in FIGS. 11A-C, but it will be understood that the technique of FIG. 15 may be utilized on another component of a mechanical system, such as, for example, a turbine blade track, a turbine seal segment, or the like.

Initially, an array of features 236 is formed in airfoil substrate 232 (400). The array may include a plurality of features 236, which may be formed proximate to edge 216 without intersecting edge 216. The features 236 may include, for example, linear grooves, linear projections, sinusoidal grooves, sinusoidal projections, a grid formed by linear or sinusoidal grooves or projections, circular depressions, circular projections, hexagonal depressions, hexagonal projections, elliptical depressions, elliptical projections, or combinations of these features 236. The features may be formed by, for example, chemical etching, photolithography, laser machining (e.g., laser grooving), electrochemical machining, electro-discharge machining, micromachining, vibropeening, or the like.

In chemical etching and photolithography, portions of airfoil substrate 232 are exposed to a chemical that reacts with airfoil substrate 232 to remove material from airfoil substrate 232. By controlling the locations that are etched by the chemical and the amount of time for which airfoil substrate 232 is exposed to the chemical, the shape of the features 236 may be controlled. The locations that are etched may be controlled by covering portions of airfoil substrate 232 that are not to be etched with a layer of material that is inert with respect to the chemical etchant. Features 236 that are defined as depressions in airfoil substrate 232 may be formed by covering portions of airfoil substrate 232 adjacent to features 236. Uncovered areas of airfoil substrate 232 are then exposed to chemical etchant, features 236 defined as depressions to be formed in airfoil substrate 232. By contrast, features 236 that are defined as projections extending out of airfoil substrate 232 may be formed by covering areas of airfoil substrate 232 that are target locations for features 236. Uncovered areas of airfoil substrate 232 are then exposed to chemical etchant to remove substrate material from around features 236, resulting in projection features 236. Combinations of depressions and projections may be formed, e.g., by repeatedly covering and etching portions of airfoil substrate 232, to selectively define depressions and projections.

In laser machining, a source of electromagnetic energy, such as an excimer laser, is used to generate a series of electromagnetic pulses of a wavelength that is absorbed by airfoil substrate 232. The intensity of the pulses is sufficient to cause portions of airfoil substrate 232 that absorb the energy to vaporize. Sequential exposure of different portions of airfoil substrate 232 may be used to vaporize airfoil substrate 232 and form features 236.

Other methods of forming features 236 may include mechanical removal of portions of substrate by, for example, a pressurized stream of water, an abrasive, water carrying an abrasive, or a tool that is sufficiently hard to deform airfoil substrate 232 or remove material from airfoil substrate 232. Alternatively, airfoil substrate 232 may be initially formed with features 236, thus removing the need for a separate machining step. According to one example, airfoil substrate 232 may be cast with features 236. An inverse profile of features 236 may be formed into a mold, e.g., a sand mold or metal mold, and then the constituent material for airfoil substrate 232 may be poured into the mold. In this manner, features 236 can be formed into surface 238 of airfoil substrate 232.

Once the array of features 236 is formed in airfoil substrate 232 (400), a first coating layer 234 may be deposited on airfoil substrate 232, including the array of features 236 (402). As described above, first coating layer 234 may include an alloy, such as a MCrAlX alloy, or a ceramic-metallic material. In a variety of examples, a ceramic-metallic material may be modified by inclusion of one or more modifying elements, such as alumina, chromia, chromium carbide, and combinations thereof. In different examples, first coating layer 234 may be an oxidation-resistant coating, such as an aluminide coating including, e.g., a platinum-aluminide diffusion coating. Alternative compositions for first coating layer 234 are possible, as will be appreciated by those of skill in the art.

First coating layer 234 may be formed on airfoil substrate 232 by, for example, a thermal spraying technique, such as air plasma spraying (APS), low pressure plasma spraying (LPPS), high velocity oxy-fuel spraying (HVOF), electroplating, or the like. First coating layer 234 may be formed to a thickness between approximately 0.001 inches and approximately 0.050 inches including, e.g., between approximately 0.005 inches and approximately 0.040 inches. In some examples, first coating layer 234 may define a thickness between approximately 0.010 inches and approximately 0.020 inches. In some examples, first coating layer 234 may substantially reproduce the geometry of airfoil substrate 232, including features 236. In other examples, first coating layer 234 may substantially reproduce the geometry of airfoil substrate 232 without reproducing features 236. In these examples, an additional portion of first coating layer 234 may be supplied on airfoil substrate 232, e.g., to fill depressions defined by features 236 or between features 236, thus leveling surface 238 of airfoil substrate 232 to create a substantially uniform surface 238.

After formation of first coating layer 234, a second coating layer 242 may be formed on first coating layer 234 (404). Second coating layer 242 may be selected based on the environmental conditions in which airfoil substrate 232 will operate and, in various examples, may include an oxidation-resistant coating. As described above, an oxidation resistant coating may include aluminide, which may or may not be modified by one or more elements. In one example, a platinum-aluminide diffusion coating may be used as an oxidation-resistant coating. Second coating layer 242 may be formed using a variety of techniques including, e.g., the techniques described for forming first coating layer 234. In some examples, second coating layer 242 may diffuse into an underlying first coating layer 234 or an underlying airfoil substrate 232. In some examples, second coating layer 242 may define a thickness that ranges from approximately 0.001 inches to approximately 0.005 inches. As with first coating layer 234, second coating layer 242 may substantially reproduce the geometry of first coating layer 234, including airfoil substrate 232 and features 236. Alternatively, second coating layer 242 may substantially reproduce the geometry of airfoil substrate 232 and/or first coating layer 234 without reproducing features 236.

While the forgoing generally described the formation of an array of features on airfoil substrate 232 proximate to edge 216 without intersecting edge 216, other techniques may be used to improve coating adhesion to an article according to this disclosure. For example, as generally described with respect to FIGS. 7A-D, an article may include a first array of features formed in a first location of a substrate and a second array of features formed in a second location in the substrate, where the first array of features have a different configuration than the second array of features (e.g., in terms of pattern, size, shape). Each of the first and second locations may be selected based on stresses (e.g., thermal and mechanical) that the first and second locations are predicted to experience during use. The predicted stresses may be determined based on experimental data, e.g., data collected from previously used or tested components, or may be predicted by theoretical modeling (e.g., finite element analysis) of stresses on the component. In some examples, the determined first and second locations may be different locations relative to edge 216 of blade tip 214. As described, stress forces may concentrate at edge 216 on blade tip 214, allowing different locations of features relative to edge 216 to reduce or eliminate the tendency of the concentrated forces to cause crack formation or crack growth. In any event, data including, e.g., experimental data or modeling data, may indicate different stress forces across blade tip 214, suggesting that some areas of blade tip 214 are more susceptible to coating delamination than other areas of blade tip 214.

FIGS. 16A-D are conceptual diagrams illustrating various examples of first and second arrays of features formed in a substrate based on predicted stresses experienced by first and second locations of the substrate. For ease of description, the arrays of features are described with reference to blade tip 214 and edge 216, e.g., as shown in FIGS. 11A-C, but it will be understood the arrays of features may be utilized on different locations of blade 200 or even on different mechanical system components. Further, while the first and second locations of the arrays of features are illustrated relative to edge 216 of blade tip 214, in different examples, the first and second locations may be differently oriented, e.g., based on predicted stresses.

Figures 16A, 16B:
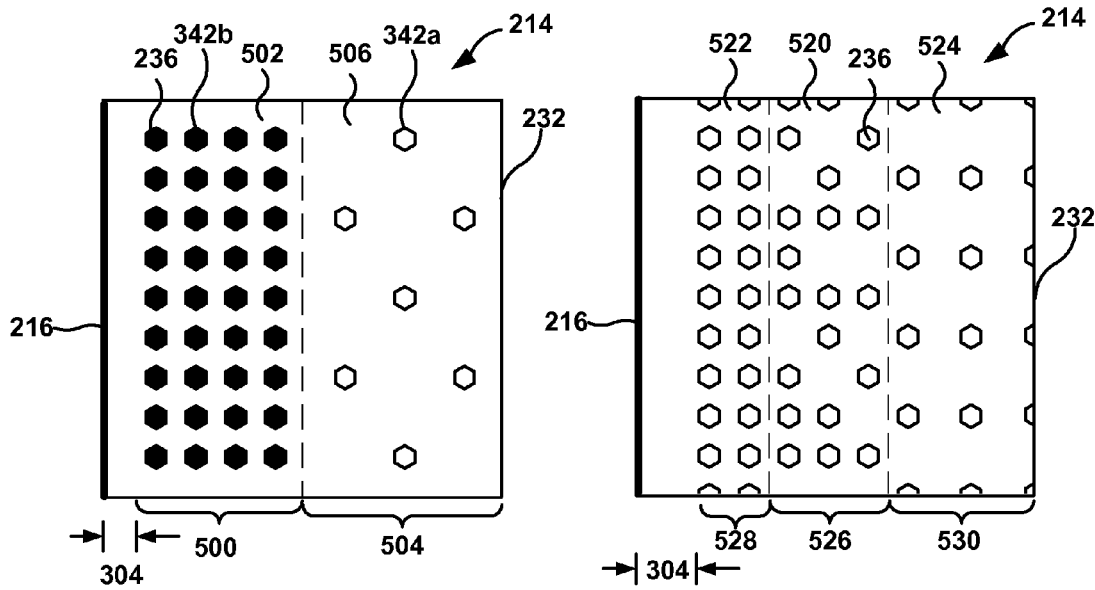
FIGS. 16A-16D are conceptual diagrams of exemplary substrates in which first and second arrays of features are formed in first and second locations of the substrate, respectively.

FIG. 16A illustrates airfoil substrate 232 having a first array 500 of features 236 formed in a first location 502 on the surface of airfoil substrate 232 and a second array 504 of features 236 formed in a second location 506 on the surface of airfoil substrate 232. In the example of FIG. 16A, first location 502 is proximate edge 216 and second location 506 is disposed away from edge 216 of blade tip 214. In other words, second array 504 of features 236 is separated from edge 216 by first array 502 of features 236. Further, in the illustrated example, each of the features 236 comprise at least one of a hexagonal depression 342a or a hexagonal projection 342b.

In some examples, the predicted stress at first location 502 may be greater than the predicted stress at second location 506. The stresses experienced by first location 502 and second location 506, respectively, may include, e.g., shear forces as blade tip 214 rotates in gas turbine engine 220 and thermal expansion and/or contraction of airfoil substrate 232 and a coating (not shown in FIG. 16A) formed on airfoil substrate 232. First location 502 may experience greater stresses due, for example, to the position of first location 502 relative to edge 216, which may act a stress riser or stress concentration location within airfoil substrate 232. Conversely, second location 506 may experience less relative stress because of its position disposed away from edge 216.

Accordingly, first location 502 may have formed therein a first array 500 of features 236, which may provide greater stress mitigation than second array 504 of features 236 formed in second location 506. For example, in the example illustrated in FIG. 16A, features 236 in first array 500 are formed in a more closely spaced pattern than features 236 in second array 504. Such a pattern divides airfoil substrate 232 into smaller domains, and may better mitigate stress than the larger spacing of features 236 in second array 504. Second array 504 may still provide stress mitigation to second location 506 of airfoil substrate 232.

In a variety of examples, positioning different arrays of features in different locations relative to an edge can affect the subsequent performance of the mechanical system component. With respect to the described blade tip 214, for example, the location of first array 500 of features 236 and second array 504 of features 236 on airfoil substrate 232 of blade tip 214 may affect the aerodynamic performance of blade 200. Improving the aerodynamic performance of blade 200 may improve both the power generation and operating efficiency of gas turbine engine 200. Thus, first array 500 of features 236 and second array 504 of features 236 may be arranged so features 236 do not intersect edge 216. In some examples, first location 502 and second location 506, and hence first array 500 and second array 504, may be arranged a minimum distance away from edge 216 including, e.g., minimum distance 304 described with respect to FIG. 13A.

Although features 236 in FIG. 16A are depicted as being uniform in size and shape, in some examples a single array 500 or 504 may include a pattern of features 236 including more than one shape and/or more than one depth or height. Examples of arrays including different shapes, depths, and heights are illustrated throughout this disclosure including, e.g., in FIGS. 7D, 8, 16D, and 17. Alternatively or additionally, a single array 500 or 504 may include a pattern in which a size of the features 236 changes throughout the array 500 or 504. For example, the size of features 236 may monotonically increase in one or two perpendicular dimensions, or may increase and then decrease in one or two perpendicular dimensions. Alternative configurations of features 236 as described herein are contemplated for first array 500 and second array 504.

As FIG. 16B illustrates, in some examples airfoil substrate 232 may include a transitional region 520, which includes a transitional array 526 of features 236. Transitional region 520 is located between a first location 522, which includes a first array 528 of features 236, and a second location 524, which includes a second array 530 of features 236. Within transitional array 526, the spacing, or pitch, between adjacent features 236 may change substantially continuously from the spacing of features 236 in first array 528 to the spacing of features 236 in second array 530.

For example, to transition from first array 528 to second array 530, each subsequent row within transitional array includes fewer features 236, and an increased spacing between adjacent features 236 within the row. In this way, transitional array may smooth the transition from first array 528 to second array 530. Transitional array 526 may provide stress mitigation that is intermediate between first array 528 and second array 530, and stress mitigation may change within transitional array 526 as the features 236 or spacing of features 236 change within transitional array 526. For example, the stress mitigation provided by transitional array 526 may be greater proximate to first array 528 than the stress mitigation provided by transitional array 526 proximate to second array 530.

Although FIG. 16B illustrates only the pitch of features 236 changing within transitional array 526, in other examples, a size, depth, height, or shape of features 236 may change from being similar to features 236 within first array 528 to being similar to features 236 within second array 230. In some examples, two or more characteristics of features 236, e.g., size, shape, depth, height, or pitch, may change within transitional array 526.

Figures 16C, 16D:
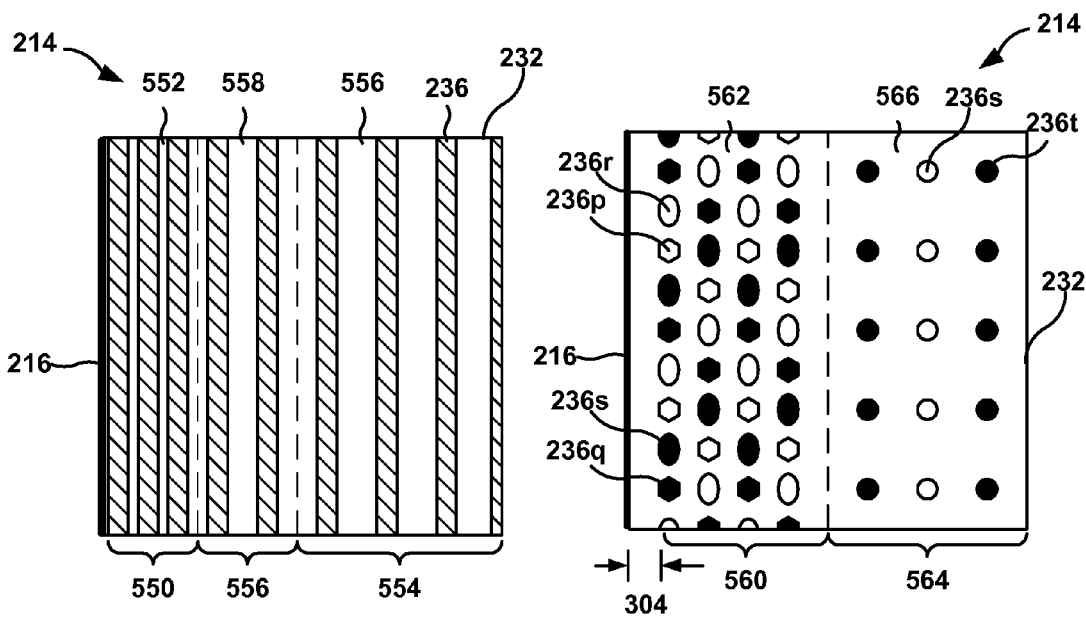

FIG. 16C illustrates airfoil substrate 232 including a first array 550 of features 236. In first array 550, features 236 comprise linear features on airfoil substrate 232 formed at a first location 552 of airfoil substrate 232. In various examples, linear features may include linear grooves, linear projections, or a combination of linear grooves and linear projections, as described with respect to FIGS. 13A and 13B. Airfoil substrate 232 also includes a second array 554 of features 236 formed at a second location 556 of airfoil substrate 232, and a transitional array 556 of features 236 formed in a transitional region 558 of airfoil substrate 232. First array 550 includes a first spacing between adjacent features 236, and second array 554 includes a second spacing between adjacent features 236. Transition array 556 includes spacing between adjacent features 236 that changes from being similar to spacing between features 236 in first array 550 to being similar to spacing between features 236 in second array 554. In this way, transitional array 556 provides a substantially continuous transition from the patter of features 236 in first array 550 to the pattern of features 236 in second array 554.

In a variety of examples, the predicted stress at first location 552 and, in particular edge 216, may be greater than the predicted stress at second location 556 or transitional region 558. Thus, locating first array 550 of features 236 at edge 216 so features 236 intersect edge 216 may be desirable to mitigate the stress on a coating layer (not shown). Countervailing considerations such as, e.g., the aerodynamic performance of blade tip 214, may indicate that first array 550 of features 236 should not intersect edge 216. Accordingly, first array 550 of features 236 may be located adjacent to edge 216 without intersecting edge 216 to improve the overall performance of blade tip 214 by, e.g., balancing stress mitigation with aerodynamic performance. In the example of FIG. 16C, first array 550 of features 236 are illustrated as one of example of being adjacent to edge 216 of blade tip 214 without intersecting edge 216. In different examples, first array 550 of features 236 may be located a minimum distance away from edge 216 including, e.g., minimum distance 304 described with respect to FIG. 13A.

While FIGS. 16A-16C illustrate first and second arrays of features 236 that include similar features 236, in some examples the first and second arrays may include different features 236, as illustrated in FIG. 16D. In FIG. 16D, airfoil substrate 232 includes a first array 560 comprising hexagonal depressions 236p, hexagonal projections 236q, elliptical depressions 236r, and elliptical projections 236s formed at a first location 526 of airfoil substrate 232 and a second array 564 of circular depressions 236s and circular projections 236t formed at a second location 566 of airfoil substrate 232. In addition, features in first array 560 are formed in a more closely spaced pattern than features in second array 564, which may provide greater stress mitigation in first location 562 than second location 566. In a variety of examples, first location 562 and second location 566, and hence first array 560 and second array 564, may arranged a minimum distance away from edge 216 including, e.g., minimum distance 304 described with respect to FIG. 13A.

First array 560 includes hexagonal depressions 236p, hexagonal projections 236q, elliptical depressions 236r, and elliptical projections 236s. In other examples, other combinations of features may be utilized in a single array, e.g., first array 560, and more than two features may be utilized in a single array. Hexagonal depressions 236p, hexagonal projections 236q, elliptical depressions 236r, and elliptical projections 236s are shown in FIG. 16D solely as an example of one combination of features. In addition, although the pitch between adjacent features 236 within first array 560 is shown as being substantially uniform, in other examples, the pitch may change within first array 560. Further, while first array 560 includes alternating offset projections and depressions, in different examples, different configurations of projections and depressions including all projections or all depressions, are contemplated.

Both the pitch and the shape of features 236 changes between first array 560 and second array 564. Once again, circular depressions 236s and circular projections 236t are merely exemplary, and any shape of features 236 may be used in second array 168.

In some examples, instead of the shape and/or pitch of features 236 changing between first array 166 and second array 168, the shape and/or pitch of features 236 may not change, and the size and/or depth/height of features 236 may change between first array 560 and second array 564. In fact, any combination of characteristics of features 236, e.g., size, shape, pitch, depth, height, cross-sectional shape, or the like, may change or may not change between first array 560 and second array 564.

Additionally, as illustrated in FIG. 16D, features 236 may be formed and may vary relative to edge 216, e.g., based on predicted stress. In the example of FIG. 16D, first array of features 560 is formed proximate to edge 216 without intersecting edge 216. In various examples, first array of features 560 may be immediately adjacent to edge 216 without intersecting edge 216. In other examples, first array of features 560 may arranged a minimum distance away from edge 216 including, e.g., minimum distance 304 described with respect to FIG. 13A.

Although not depicted in FIGS. 16A-16D, in some examples, a first array of features may include substantially continuous features (e.g., linear features 302 of FIG. 13A), while a second array of features includes discrete features (e.g., circular features 332 of FIG. 13D). Further, a first and/or second array of features may include a combination of continuous and discrete features, e.g., as illustrated with respect to FIG. 13G. Other combinations of features and arrays of features will be apparent to those of skill in the art.

Figure 17:
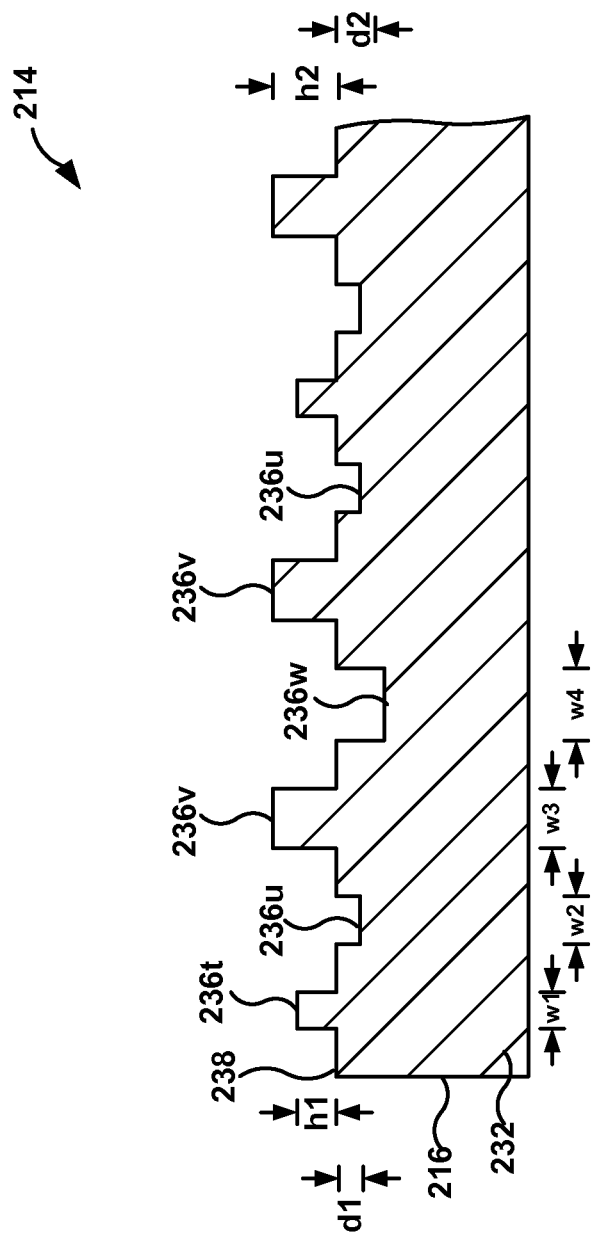
FIG. 17 is a cross-sectional diagram of an example substrate that includes features formed with different sizes and depths.

FIG. 17 is a cross-sectional diagram of an exemplary airfoil substrate 232 that includes a plurality of features 236 formed in surface 238 of blade tip 214. Features 236 may all be in a single array, e.g., a first array, or may be distributed among multiple arrays. As shown in FIG. 17, features 236 include a depth, a height, and a size (width) that changes within the array. For example, first feature 236t includes a height h1 and a width w1. First feature 236t is arranged proximate to edge 216 without intersecting edge 216. Second feature 236u includes a depth d1 and a width w2. Width w2 is greater than width w1 in the example of FIG. 17. Third feature 236v includes a height h2 and a width w3, which are greater than height h1 and width w1, respectively, of feature 236t. Finally, fourth feature 236w includes a depth d2 and a width w4, which are greater than depth d1 and width w2, respectively, of feature 236u. Features 236t, 236u, 236v, and 236w are arranged in a repeating pattern, alternating between projections and depressions.

It shall be appreciated that the example of FIG. 17 is merely illustrative. In other examples, features 236 may be all projections, all depressions (e.g., FIG. 8), or may include a different arrangement of projections and depressions. Further, the depth and/or height and/or width of features 236 may vary other than as illustrated in FIG. 17, e.g., one of depth or height may change while width remains constant. As described above, in addition to or instead of the depth and/or height and/or width changing, a shape, cross-sectional profile, or pitch of features 236 may change within an array. Although not shown in FIG. 17, one or more coatings may be formed on surface 238 of blade tip 214. As described in this disclosure, features 236 may, for example, increase adhesion of such coatings to surface 238 compared to examples in which the surface of a blade tip is substantially planar.

Figure 18:
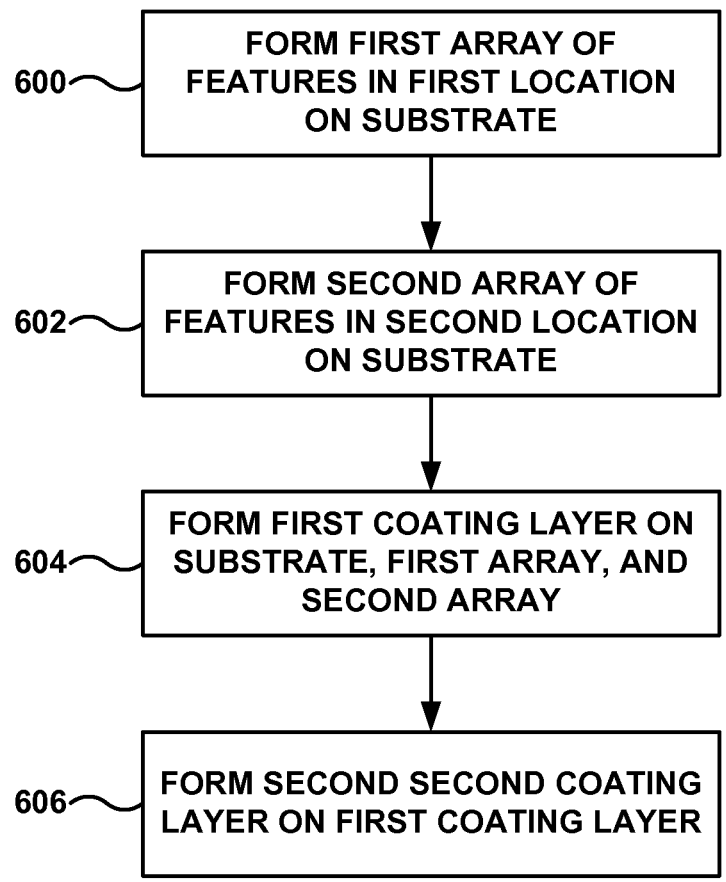
FIG. 18 is a flow diagram of an example technique of forming an article including a first array of features in a first location on a substrate and a second array of features in a second location on the substrate.

FIG. 18 is a flow diagram of an exemplary technique for forming an article including a first array of features in a first location of a substrate and a second array of features in a second location of the substrate. The technique of FIG. 18 will be described with reference to FIG. 16A for ease of description, but it shall be understood that the technique of FIG. 18 will applicable to other examples including a first array and second array of features formed in a substrate.

Initially, a first array 500 of features 236 is formed in a first location 502 on airfoil substrate 232 (600). In some examples, first array 500 of features 236 is formed proximate edge 216 without intersecting edge 216. In some additional example, first array 500 of features 236 are formed a minimum distance 304 away from edge 236. Features 236 may include hexagonal projections and hexagonal depressions, as illustrated in FIG. 16A, or may include, for example, linear grooves, linear projections, sinusoidal grooves, sinusoidal projections, a grid formed by linear or sinusoidal grooves or projections, circular depressions or projections, elliptical depressions or projections, or combinations of these features 236. Features 236 with different shapes may also be implemented. Features 236 may be formed by, for example, chemical etching, photolithography, laser machining, electrochemical machining, electro-discharge machining, micromachining, vibropeening, or the like. Alternatively, features 236 may be cast into airfoil substrate 232. When first array 500 of features 236 includes both projections and depressions, as illustrated in FIG. 16A, the projections and depressions may be formed substantially simultaneously (e.g., formed at the same time) or formed sequentially (e.g., either the projections or depressions may be formed and then the remaining set of either projections or depressions may be formed).

As described above, first location 502 may be selected or determined based on a prediction of stress that airfoil substrate 232 will experience during use. The stress may be predicted based on experimental data, such as data collected during use of a similar substrate under similar condition to those which airfoil substrate 232 will experience. Further, in some examples, the stress may be predicted based on theoretical stress calculations, e.g., based on the material properties of airfoil substrate 232 and one or more coating layers.

Once first array 500 is formed in airfoil substrate 232 (600), second array 504 of features 236 may be formed in a second location 506 of airfoil substrate 232 (602). A process similar to that used to form first array 500 may be used to form second array 504. In some examples, second array 504 may be formed substantially simultaneously with first array 500. In other examples, second array 504 may be formed after first array 500. According to one example, all projections (including in first array 500 and second array 504) are formed in airfoil substrate 232 followed by the formation of all depressions (again, including in first array 500 and second array 504) in airfoil substrate 232.

Similar to first location 502, second location 506 may be selected or determined based on a predicted stress that airfoil substrate 232 will experience during use. The predicted stress may be made based on experimental data, such as data collected during use of a similar substrate under similar condition to those which airfoil substrate 232 will experience. In some examples, the predicted stress may be made based on theoretical stress calculations, e.g., based on the material properties of airfoil substrate 232 and one or more coating layers.

As described above, first array 500 and second array 504 may include first and second patterns of features 236, respectively. The patterns may be defined by a shape, size, depth, height, pitch, or cross-sectional profile of the features 236. In some examples, only one of these characteristics may change between first array 500 and second array 504, while in other examples, two or more of these characteristics may change between first array 500 and second array 504.

Although not shown in FIG. 18, in some examples the technique may optionally include forming a transitional array (e.g., transitional array 526 in FIG. 16B) in airfoil substrate 232. As described above, the transitional array may include a pattern which transitions from being similar to the pattern in first array 500 proximate to first array 500 and being similar to second array 504 proximate to second array 504. The transitional array may be formed by any of the processes used to form first array 500 and/or second array 504. In some examples, the transitional array may be formed substantially simultaneously with first array 500 and/or second array 504. In other examples, transitional array may be formed sequentially with first array 500 and/or second array 504.

Once first array 500, second array 504 and, optionally, the transitional array have been formed in airfoil substrate 232, a first coating layer 234 (FIG. 11) may be formed on airfoil substrate 232, including features 236 in first array 500 and second array 504 (604). As described above, first coating layer 234 may be a blade tip coating. In some examples, first coating layer 234 may include an alloy, such as an MCrAlX alloy, or a ceramic-metallic material. In a variety of examples, a ceramic-metallic material may be modified by inclusion of one or more modifying elements, such as alumina, chromia, chromium carbide, and combinations thereof. In different examples, first coating layer 234 may be an oxidation-resistant coating, such as an aluminide coating including, e.g., a platinum-aluminide diffusion coating. Alternative compositions for first coating layer 234 are possible, as will be appreciated by those of skill in the art.

First coating layer 234 may be formed on airfoil substrate 232 by, for example, thermal spraying technique, such as air plasma spraying (APS), low pressure plasma spraying (LPPS), high velocity oxy-fuel spraying (HVOF), electroplating, or the like. First coating layer 234 may be formed to a thickness between approximately 0.001 inches and approximately 0.050 inches including, e.g., between approximately 0.005 inches and approximately 0.040 inches. In some examples, first coating layer 234 may define a thickness between approximately 0.010 inches and approximately 0.020 inches. In some examples, first coating layer 234 may substantially reproduce the geometry of airfoil substrate 232, including features 236. In other examples, first coating layer 234 may substantially reproduce the geometry of airfoil substrate 232 without reproducing features 236. In these examples, an additional portion of first coating layer 234 may be supplied on airfoil substrate 232, e.g., to fill depressions defined by features 236 or between features 236, thus leveling surface 238 of airfoil substrate 232 to create a substantially uniform surface 238.

After formation of first coating layer 234, a second coating layer 242 may be formed on first coating layer 234 (606). Second coating layer 242 may be selected based, e.g., on the environmental conditions in which airfoil substrate 232 will operate and, in various examples, may include an oxidation-resistant coating. As described above, an oxidation resistant coating may include aluminide, which may or may not be modified by one or more elements. In one example, a platinum-aluminide diffusion coating may be used as an oxidation-resistant coating. Second coating layer 242 may be formed using a variety of techniques including, e.g., the techniques described for forming first coating layer 234. In some examples, second coating layer 242 may diffuse into an underlying first coating layer 234 or an underlying airfoil substrate 232. In some examples, second coating layer 242 may define a thickness that ranges from approximately 0.001 inches to approximately 0.005 inches. As with first coating layer 234, second coating layer 242 may substantially reproduce the geometry of first coating layer 234, including airfoil substrate 232 and features 236. Alternatively, second coating layer 242 may substantially reproduce the geometry of airfoil substrate 232 and/or first coating layer 234 without reproducing features 236.

Various examples have been described. These and other examples are within the scope of the following claims.

The invention claimed is:

1. An article comprising:
a substrate;
a plurality of cooling holes formed in the substrate;
a grid of grooves in a surface of the substrate, wherein each of the grooves does not extend through the substrate, wherein the grid of grooves comprises a first plurality of grooves formed substantially parallel to each other and a second plurality of grooves formed substantially parallel to each other, wherein the grooves from the first plurality of grooves intersect grooves from the second plurality of grooves, wherein the grid of grooves defines a plurality of plateaus in the substrate, and wherein a respective cooling hole of the plurality of cooling holes is formed in a respective plateau of the plurality of plateaus; and
a thermal barrier coating on the substrate, including on the grid of grooves and the plurality of plateaus.

2. The article of claim 1, wherein the grid of grooves comprises at least one of a grid of linear grooves or a grid of sinusoidal grooves.

3. The article of claim 1, wherein the grid of grooves comprises at least a first groove and a second groove, and wherein the first groove comprises a first depth and the second groove comprises a second depth different than the first depth.

4. The article of claim 1, wherein the grid of grooves comprises at least a first groove and a second groove, and wherein the first groove comprises a first width and the second feature comprises a second width different than the first width.

5. The article of claim 1, wherein the grid of grooves comprises a first groove, a second groove, a third groove, and a fourth groove, and wherein a first pitch between the first groove and the second groove is different than a second pitch between the third groove and the fourth groove.

6. The article of claim 1, wherein the thermal barrier coating comprises:
a bond coat on the substrate, including the grid of grooves and the plurality of plateaus; and
a thermally insulative layer on the bond coat, wherein the thermally insulative layer comprises a plurality of vertically oriented cracks.

7. The article of claim 1, wherein the thermal barrier coating comprises:
a bond coat on the substrate, including the grid of grooves and the plurality of plateaus;
a first thermally insulative layer comprising a first porosity on the bond coat; and
a second thermally insulative layer comprising a second porosity on the first thermally insulative layer, wherein the first porosity is less than the second porosity.

8. An article comprising:
a substrate;
a plurality of cooling holes formed in the substrate;
a first array of features on a surface of the substrate at a first location, wherein the first array comprises a first pattern comprising a grid of grooves, wherein each of the grooves does not extend through the substrate, wherein the grid of grooves comprises a first plurality of grooves formed substantially parallel to each other and a second plurality of grooves formed substantially parallel to each other, wherein the grooves from the first plurality of grooves intersect grooves from the second plurality of grooves, wherein the grid of grooves defines a plurality of plateaus in the substrate, and wherein a respective cooling hole of the plurality of cooling holes is formed in a respective plateau of the plurality of plateaus;
a second array of features on the surface of the substrate at a second location, wherein the second array comprises a second pattern different than the first pattern, wherein the first location is predicted to experience a first level of thermal stress and the second location is predicted to experience a second level of thermal stress different than the first level of thermal stress; and
a thermal barrier coating on the substrate, on the first array of features, including on the grid of grooves and the plurality of plateaus, and on the second array of features.

9. The article of claim 8, wherein the first array of features comprises at least one of a grid of linear grooves or a grid of sinusoidal grooves, and wherein the second array of features comprises an array of at least one of linear grooves, sinusoidal grooves, circular depressions, ellipsoidal depressions, or hexagonal depressions.

10. The article of claim 8, wherein the first pattern comprises at least one of a depth of the grooves, a width of the grooves, a pitch between the grooves, or a shape of the grooves, and wherein the second pattern comprises at least one of a depth of the features, a size of the features, a pitch between the features, or a shape of the features.

11. The article of claim 10, wherein a first groove in the grid of grooves comprises a first depth, and a second groove in the grid of grooves comprises a second depth different than the first depth.

12. The article of claim 10, wherein a first groove in the grid of grooves comprises a first width, and a second groove in the first grid of grooves comprises a second width different than the first width.

13. The article of claim 10, wherein the grid of grooves comprises a first groove, a second groove, a third groove, and a fourth groove, and wherein a first pitch between the first groove and the second groove is different than a second pitch between the third groove and the fourth groove.

14. The article of claim 8, wherein the thermal barrier coating comprises:
a bond coat on the substrate, the first array of features, and the second array of features; and
a thermally insulative layer on the bond coat, wherein the thermally insulative layer comprises a plurality of vertically oriented cracks.

15. The article of claim 8, wherein the thermal barrier coating comprises:
a bond coat on the substrate, the first array of features, and the second array of features;
a first thermally insulative layer comprising a first porosity on the bond coat; and
a second thermally insulative layer comprising a second porosity on the first thermally insulative layer, wherein the first porosity is less than the second porosity.

16. The article of claim 8, wherein the thermal barrier coating comprises:
a first thermally insulative layer on the first array of features, wherein the first thermally insulative layer comprises a first composition; and a second thermally insulative layer on the second array of features, wherein the second thermally insulative layer comprises a second composition different than the first composition.

17. A method comprising:
forming a grid of grooves in a surface of a substrate, wherein each of the grooves does not extend through the substrate, wherein the grid of grooves comprises a first plurality of grooves formed substantially parallel to each other and a second plurality of grooves formed substantially parallel to each other, wherein the grooves from the first plurality of grooves intersect grooves from the second plurality of grooves, wherein the grid of grooves defines a plurality of plateaus in the substrate, and wherein a respective cooling hole of a plurality of cooling holes is formed in a respective plateau of the plurality of plateaus; and
forming a thermal barrier coating on the substrate, including on the grid of grooves and the plurality of plateaus.

18. The method of claim 17, wherein the grid of grooves comprises at least one of a grid of linear grooves or a grid of sinusoidal grooves.

19. The method of claim 17, wherein the grid of grooves comprises at least a first groove and a second groove, and wherein the first groove comprises a first depth and the second groove comprises a second depth different than the first depth.

20. The method of claim 17, wherein the grid of grooves comprises at least a first groove and a second groove, and wherein the first groove comprises a first width and the second groove comprises a second width different than the first width.

21. The method of claim 17, wherein the grid of grooves comprises a first groove, a second groove, a third groove, and a fourth groove, and wherein a first pitch between the first groove and the second groove is different than a second pitch between the third groove and the fourth groove.

22. The method of claim 17, wherein forming the thermal barrier coating over the substrate, including on the grid of grooves and the plurality of plateaus comprises:
forming a bond coat over the substrate, including on the grid of grooves and the plurality of plateaus; and
forming a thermally insulative layer over the bond coat, wherein the thermally insulative layer comprises a plurality of vertically oriented cracks.

23. The method of claim 17, wherein forming the thermal barrier coating over the substrate, including on the grid of grooves and the plurality of plateaus comprises:
forming a bond coat over the substrate, including on the grid of grooves and the plurality of plateaus;
forming a first thermally insulative layer comprising a first porosity over the bond coat; and
forming a second thermally insulative layer comprising a second porosity over the first thermally insulative layer, wherein the first porosity is less than the second porosity.

24. A method comprising:
forming a first array of features on a surface of a substrate at a first location, wherein the first location is selected based on a first predicted level of thermal stress, wherein the first array of features comprises a first pattern comprising a grid of grooves, wherein each of the grooves does not extend through the substrate, wherein the grid of grooves comprises a first plurality of grooves formed substantially parallel to each other and a second plurality of grooves formed substantially parallel to each other, wherein the grooves from the first plurality of grooves intersect grooves from the second plurality of grooves, wherein the grid of grooves defines a plurality of plateaus in the substrate, and wherein a respective cooling hole of a plurality of cooling holes is formed in a respective plateau of the plurality of plateaus;
forming a second array of features on the surface of the substrate at a second location, wherein the second location is selected based on a second predicted level of thermal stress, and wherein the second array of features comprises a second pattern different than the first pattern; and
forming a thermal barrier coating over the substrate, over the first array of features, including on the grid of grooves and the plurality of plateaus, and over the second array of features.

25. The method of claim 24, wherein the first array of features comprises at least one of a grid of linear grooves or a grid of sinusoidal grooves, and wherein the second array of features comprises an array of at least one of linear grooves, sinusoidal grooves, circular depressions, ellipsoidal depressions, or hexagonal depressions.

26. The method of claim 24, wherein the first pattern comprises at least one of a depth of the grooves, a width of the grooves, a pitch between the grooves, or a shape of the grooves, and wherein the second pattern comprises at least one of a depth of the features, a size of the features, a pitch between the features, or a shape of the features.

27. The method of claim 24, wherein a first groove in the grid of grooves comprises a first depth, and a second groove in the grid of grooves comprises a second depth different than the first depth.

28. The method of claim 24, wherein a first groove in the grid of grooves comprises a first width, and a second groove in the grid of grooves comprises a second width different than the first width.

29. The method of claim 24, wherein the grid of grooves comprises a first groove, a second groove, a third groove, and a fourth groove, and wherein a first pitch between the first groove and the second groove is different than a second pitch between the third groove and the fourth groove.

30. The method of claim 24, wherein the first predicted level of thermal stress and the second predicted level of thermal stress are predicted based on experimental observations.

31. The method of claim 24, wherein forming the thermal barrier coating over the substrate, over the first array of features, including on the grid of grooves and the plurality of plateaus, and over the second array of features comprises:
forming a bond coat over the substrate, the first array of features, and the second array of features; and
forming a thermally insulative layer over the bond coat, wherein the thermally insulative layer comprises a plurality of vertically oriented cracks.

32. The method of claim 24, wherein forming the thermal barrier coating over the substrate, over the first array of features, including on the grid of grooves and the plurality of plateaus, and over the second array of features comprises:
forming a bond coat over the substrate, the first array of features, and the second array of features;
forming a first thermally insulative layer comprising a first porosity over the bond coat; and
forming a second thermally insulative layer comprising a second porosity over the first thermally insulative layer, wherein the first porosity is less than the second porosity.

33. The method of claim 24, wherein forming the thermal barrier coating over the substrate, over the first array of features, including on the grid of grooves and the plurality of plateaus, and over the second array of features comprises:

forming a first thermally insulative layer over the first array of features, wherein the first thermally insulative layer comprises a first composition; and forming a second thermally insulative layer over the second array of features, wherein the second thermally insulative layer comprises a second composition different than the first composition.

34. The article of claim 1, wherein a single respective cooling hole from the plurality of cooling holes is formed in each plateau from the plurality of plateaus.

35. The article of claim 34, wherein the first plurality of grooves includes adjacent parallel grooves, and wherein a distance between the adjacent parallel grooves is between about 5.08 millimeters and about 7.62 millimeters.

* * * * *